(12) United States Patent
Kobayashi et al.

(10) Patent No.: US 6,194,856 B1
(45) Date of Patent: Feb. 27, 2001

(54) MOTOR DRIVING APPARATUS INCLUDING A MODULARIZED CURRENT CONTROL CIRCUIT AND METHOD OF CONTROLLING THE SAME

(75) Inventors: Sumio Kobayashi, Chiba-ken; Makoto Takase, Funabashi; Hisakazu Ninomiya, Chiba, all of (JP)

(73) Assignees: Hitachi, Ltd., Tokyo; Hitachi Keiyo Engineering Co., Ltd., Chiba-ken, both of (JP)

( * ) Notice: Subject to any disclaimer, the term of this patent is extended or adjusted under 35 U.S.C. 154(b) by 0 days.

(21) Appl. No.: 09/490,686

(22) Filed: Jan. 24, 2000

(30) Foreign Application Priority Data

Jan. 25, 1999 (JP) .................................. 11-015207
Feb. 25, 1999 (JP) .................................. 11-047586

(51) Int. Cl.[7] .............................. H02P 5/41; H02M 5/40
(52) U.S. Cl. ...................... 318/432; 318/563; 388/903; 388/907.5
(58) Field of Search .................................. 318/563, 600, 318/602, 605, 661, 432, 433, 434; 388/903, 907.5, 934

(56) References Cited

U.S. PATENT DOCUMENTS 4,262,336 * 4/1981 Pritchard .......................... 364/474
4,475,150 * 10/1984 D'Atre et al. .................... 363/51
6,005,366 * 12/1999 Majumdar et al. ............... 318/811

* cited by examiner

Primary Examiner—Bentsu Ro
(74) Attorney, Agent, or Firm—Antonelli, Terry, Stout & Kraus, LLP

(57) ABSTRACT

In a controller, for use in an electric motor, which self-contains a current control system, a conducting portion of a feedback element from a current detector up to a summing point, and a conducting portion of a forward element from the summing point for the current control up to a gate terminal of each of switching devices are mounted in a power module to be hermetically encapsulated without being exposed to the external ambient atmosphere. The distributed processing is executed in the two portions, i.e., a current control loop, and a position control unit, a velocity control unit and an interface processing unit other than the current control loop. Therefore, the current control loop including the current feedback portion is constituted by another sub-microprocessor to be mounted together with the associated devices in a power module which is molded with resin such as epoxy resin.

12 Claims, 23 Drawing Sheets

MOTOR DRIVING APPARATUS INCLUDING A MODULARIZED CURRENT CONTROL CIRCUIT AND METHOD OF CONTROLLING THE SAME

BACKGROUND OF THE INVENTION

The present invention relates in general to an electric motor driver for driving an electric motor, and more particularly to an electric motor driver which includes in the inside thereof a current control loop, with which an electric motor current is detected to form the feedback control unit, and which is suitable for controlling a position, velocity, a current, a torque and the like.

As the microprocessors have advanced, in the electric motor control apparatuses as well for use in the general industrial machines, the conventional analog control has been changed into the digital control employing the microcontroller. The devices and components which are used in the printed circuit boards have also been changed from the transistors to the IC (Integrated Circuit) and further to the MSI (Medium Scale Integrated Circuit), the LSI (Large Scale Integrated Circuit) and the VLSI (Very Large Scale Integrated Circuit) so that the ASIC (Application Specific IC), the dedicated customs LSI which is ordered by the customer, the gate arrays and the like have been used. Thus, the miniatulization of the controllers have advanced. Also, the ministulization of the package of the digital IC has further advanced by adopting the technique of mounting them to the surface of the printed circuit board. In addition, as the high density integration of the ICs has advanced, the number of lead terminals of the IC chip (the number of pins) has exceeded 100, and along with this, instead of the conventional IC including the lead terminals which have the pitch of 2.54 mm, the IC chip including the lead terminals which have the pitch of 1.27 mm called the half pitch, and further the IC chip including the lead terminals which have 1.00 mm, 0.8 mm or 0.75 mm pitch have been used. In addition, in recent years, the lead package having the pitch of 0.5 mm has also been used. In correspondence thereto, for the conductor pattern spacing of the printed circuit board, in recent years, the design has been advanced from the construction in which one conductor pattern is passed through the space defined between the adjacent lead terminals having the pitch of 2.54 mm to the construction in which three conductor patterns or three or more conductor patterns are passed through the space defined between the adjacent lead terminals having the pitch of 2.54 mm. Thus, the high density mounting for the printed circuit board has advanced.

On the other hand, with respect to the power source for subjecting the general industrial machine to the variable speed running, the vector control without any of velocity sensors with which the induction motor as the A.C. motor is driven by the inverter, and the vector control with a velocity sensor are adopted, and also the A.C. servo motor, which self-contains a position sensor and a velocity sensor, for use in the machine tools, the metal processing machines, the assembly machines, the spinning machines, the weaving machines, the robots, or the like has been actively used, from the request for the automation and the labor saving, in the processing/assembling field or the like. The basic control thereof is the position, velocity, current and torque control. From the request for the promotion of the high speed for the line velocity and the promotion of the high speed for a tact time in recent years, in the vector control for the induction motor, the high speed current control is carried out in such a way that the current of the motor is separated into the current component for the torque which is in proportion to the torque and another current component for the magnetic flux which intersects perpendicularly the current component for the torque. In addition, in the case of the A.C. servo motor, for the revolving-field type synchronous motor employing the permanent magnet as the rotor, the position of the permanent magnet is detected by the magnetic pole positions detector (rotor position detector) in order to carry out the high speed current control. In any case, the instantaneous value of the current is controlled.

The place where each of those A.C. motor controllers is installed is located within the control board which is installed in the vicinity of the motor in the assemble field or the processing field, and hence in the environment in the periphery of the control board, the scrap metal which has been generated by the cutting and the cutting oil are floated in the air, and in the case of the tire processing factory, the dust containing therein carbon particles which has been generated in processing rubber is floated in the air, and also in the case of the textile factory or the spinning machine factory, the cotton dust is floated in the air. Those carbon dust and cotton dust are adhered little by little to the printed circuit board provided within the controller. In addition, in the weaving machine factory, in the water jet style wherein the weft yarns of the automatic weaving machine for knitting the warps and the weft yeans are blown by the water, since the water is treated, the humidity in the periphery thereof is increased, and the dew condensation is generated on the printed circuit board of the motor control circuit as the temperature falls gradually. The ICs are mounted on the printed circuit board and the above-mentioned devices having the small lead pitch are mounted thereon. For this reason, the leads of the ICs will be covered with the dust containing carbon or the cotton dust which have been adhered to the printed circuit board with lapse of time.

When the running of the A.C. motor is started in the morning everyday, upon the start of the running, the temperature in the control board rises, and then when the running of the A.C. motor is stopped in the night, the temperature in the control board falls and the external air temperature also falls. For this reason, the humidity of the air, within the control board, which is heated in the daytime is increased and when it becomes the night, the dew condensation occurs on the circuit board with the dust containing carbon and the cotton dust at the temperature equal to or lower than the critical temperature. Then, if at the time when starting the running in the morning on the next day, the supply of the electric power to the circuit board is started, then the electrical short circuit may occur between the adjacent leads of the ICs in some cases. While this electrical short circuit is apt to occur in the rainy season. In the case of the weaving machine of the water jet style in which the water is used, the electrical short circuit occurs irrespective of any of the seasons. For this reason, the operation of the motor control circuit may lead to the malfunction, and the semiconductor devices in the inverter main circuit may be broken down in some cases.

Next, the description will hereinafter be described in detail with respect to the influences in the case where the adjacent leads are electrically short circuited resulting from that the dust and the cotton dust have been adhered to the lead terminals of the ICs mounted on the printed circuit board of the A.C. servo motor control circuit for controlling the position, velocity, current and torque, and also the moisture is bedewed together with the dust and the cotton dust.

FIG. 1 is a control block diagram, partly in circuit diagram, showing a configuration of an A.C. servo motor as a conventional one example. In the figure, reference numeral 1 designates a servo motor, and reference numeral 2 designates an encoder which includes complexly a magnetic pole positions sensor 2-1 for detecting the magnetic pole positions of a rotor of the A.C servo motor and a rotational speed and position sensor 2-2 for detecting the rotational speed and position of the A.C. servo motor, and also which is self-contained in the A.C. servo motor. Reference numeral 3 designates a position control unit, reference numeral 5 designates a velocity control unit, reference numeral 7 designates a current control unit, and reference numeral 8 designates a PWM (Pulse Width Modulation) control computing unit. These constituent elements 3, 5, 7 and 8 constitute the forward element. Also, reference numeral 4 designates a position counter circuit, reference numeral 6 designates a velocity computing circuit, and reference numeral 10 designates a current detection circuit. In this connection, these constituent elements constitute the feedback elements of the position, velocity and current feedback loops, respectively. Reference numeral 9 designates a magnetic pole positions computing circuit for receiving, as its inputs, the signals from the magnetic pole positions sensor (rotor position sensor) 2-1 and the rotational speed and position sensor 2-2 for the rotor of the A.C. servo motor 1 to compute the positions of the magnetic poles of the rotor. Reference numeral 13 designates an inverter main circuit which includes a driver for driving each of switching devices and a control power source circuit therefor. Of those constituent elements, the inverter main circuit is mounted in the power module which is molded with resin such as epoxy resin. Reference numeral 11 designates a current detector for detecting the current which is caused to flow through the A.C. servo motor to feed the current thus detected back to a current detection circuit 10. In this connection, reference numerals 12-1 to 12-3 designate respectively summing points at each of which the sign + represents the addition and the sign − represents the subtraction. In FIG. 1, since the command signal is denoted by the sign + and the feedback is denoted by the sign −, the constituent elements associated with the feedback constitute the negative feedback control circuit.

First of all, a position command θref is issued to this controller 25, and then this position command θref is compared with a position feedback value θf, which has been detected in the position counter circuit 4 on the basis of the signal outputted from the rotational speed and position sensor 2-2 of the encoder 2, in a comparator 12-1. The position deviation as this result of the comparison is inputted to the position control unit 3 and then is outputted in the form of a velocity command Nref from the unit 3. This output signal is further compared with a velocity feedback value Nf, which has been computed in the velocity computing circuit 6 on the basis of the signal outputted from the rotational speed and position sensor 2-2, in a comparator 12-2 and then the resultant deviation is inputted to the velocity control unit 5. The output signal is outputted in the form of a current command Iref from the velocity control unit 5 and then is compared with a current feedback value If, which has been obtained through the current detector 11 and the current detection circuit 10, in a comparator 12-3. Then, the resultant deviation is inputted to the current control unit 7. The output signal of the current control unit 7 becomes a PWM signal through the PWM control unit 8 to be supplied to the power switching device 13 so that the current is supplied to the A.C. servo motor 1 to control the A.C. servo motor 1.

Incidentally, since the permanent magnet type A.C. servo motor requires the positions of the magnetic poles of the motor, the positions of the magnetic poles are obtained in the magnetic pole positions computing circuit 9 on the basis of the signal outputted from the magnetic pole positions sensor 2-1 of the encoder 2, and the signal exhibiting the the positions of the magnetic poles is inputted to the current control unit 7 to be used to carry out the control.

Now, the three kinds of feedback loops, i.e., the position feedback loop, the velocity feedback loop and the current (torque) feedback loop are formed. In general, with respect to the responsibility of each of the feedback loops, the responsibility is made rapid and also the stable control system which has the small overshoot and undershoot is formed as the loop is formed in the more inner side. The responsibility is, in the case of the velocity control, set 4 to 6 times as large as that of the position control, and the responsibility of the current control is set 4 to 6 times as that of the velocity control. For this reason, when the software processing is executed in the microprocessor CPU, in general, the computing period of the software is most rapid in the current feedback loop, and the computing period of the software is next in speed that of the current feedback loop, and also the processing speed of the position feedback loop is lowest.

FIG. 2 is a block diagram showing a configuration of an example of the general external protection form, i.e., an external protection apparatus 18 which is provided in the outside of the A.C. servo motor 1, the encoder 2 and the A.C. servo motor controller 20. The apparatus 18 is the apparatus for striving for the safety of the workers when the malfunction occurs in the A.C. servo motor. In the apparatus 18, the protection system corresponding to the machine is installed. Such sensors of the protection system include an acceleration sensor 14 which is installed on the machine side, an over velocity sensor 15, and right-hand and left-hand edge sensors 16 which are respectively mounted to the both sides of the operation range. Then, when having exceeded the specified acceleration or when having exceeded the specified velocity, or when having exceeded the specified operation range of the machine, the output signals which have been outputted from those sensors are respectively inputted to a protection processing circuit 17 for preventing the run away to stop the operation of the A.C. servo motor. In addition, by operating this external protection apparatus 18, the safety management, such as the operation of turning OFF the main circuit power source and the operation of putting ON the machine brake, is carried out. In general, the A.C. servo motor 1, the encoder 2 and the A.C. servo motor controller 20 are all manufactured as the general purpose products by the electrical machinery and apparatus manufacturers, while the set makers purchase those electrical machinery and apparatuses to carry out the mechanical design in order to install the external protection system for the overall system including the electricities and the machines.

FIG. 3 is a circuit diagram showing a configuration of an internal circuit of an example of a power module which is used in the conventional A.C. servo motor controller. In the figure, A.C. power sources are connected to terminals R, S and T, respectively, and each of power source voltages is converted from an A.C. form to a D.C. form by a diode rectifier 43. A current limiting resistor (not shown) which is provided in the outside of the power module is connected between terminals P and P1, while a ballast capacitor (not shown) is connected between the terminals P1 and N so that the rush current which is caused to flow through the ballast capacitor when turning ON the A.C. power source is limited by the current limiting resistor. The D.C. voltage which has been smoothed by the ballast capacitor is then applied to an inverter circuit 45 which is constituted by six sets of inverse parallel circuits consisting of switching devices Su, Sv, Sw, Sx, Sy and Sz (power transistors and the like) and diodes Du, Dv, Dw, Dx, Dy and Dz. By enabling/disabling the base or the gate of each of the switching devices, A.C. voltages is outputted to drive an A.C. servo motor (not shown) which is connected to output terminals U, V and W. In addition, the energy which is regenerated from the A.C. servo motor is accumulated in the ballast capacitor which is connected between the terminals P1 and N, and when the D.C. voltage has been increased, a switching device of a regenerative braking circuit 44 is turned ON together with the discharge resistor (not shown) which is connected between the terminals P1 and BR, and the regenerative energy is consumed through the discharge resistor. The gate input signals of the seven switching devices of the regenerative braking circuit and the inverter circuit are supplied from a driver circuit which is provided in the outside of the power module. These gate terminals GU, EU, GV, EV, GW, EW, GX, GY, GZ and E are, as shown in a power module 22 of FIG. 4 which will be described later, the fine lead terminals and are arranged at small pitches. On the other hand, the main circuit terminals are thick lead terminals and are arranged at large spacing through which the dust may be readily passed. In the main circuit printed circuit board, those lead terminals are passed therethrough in correspondence to the terminal positions of the power module 22 and are electrically connected thereto by the soldering. The lead pitch of the gate terminals of the main circuit board becomes similarly small, and if absolutely similarly to the lead pitch of the IC, the electric power is supplied in the state in which the moisture is bedewed together with the dust and the cotton dust, the electrical short circuit occurs between the adjacent leads of the gate terminals of the power module in some cases.

FIG. 4 is an exploded view showing the construction of an example of a conventional A.C. servo motor controller. In the figure, reference numeral 22 designates the power module which has been described with reference to FIG. 3 and which is mounted to a cooling fin 21. Reference numeral 19 designates a logic printed circuit board, and reference numeral 23 designates a main circuit on a printed circuit board. Reference numeral 24 designates a cover with which the power module 22 and the two sheets of printed circuit boards 19 and 23 are covered. Ventilating holes 39 are bored through the cover so that the air which has been heated in the apparatus can be exhausted to the outside in a naturally air-cooling manner. In addition, through holes 40, 41 and 42 are formed in the front face in order to introduce therethrough a main circuit connector 26 which is mounted to the main circuit printed circuit board 23, an I/O connector 37 which is mounted to the logic printed circuit board 19, and an encoder connector 38, respectively.

The logic printed circuit board 19 corresponds to the board on which the constituent devices are mounted which are surrounded by the frame denoted by reference numeral 19 in FIG. 1, and which includes the IC devises such as one microprocessor (CPU) 31 for controlling and computing the positions, the velocity, the current (torque) and the like, an A/D converter 32 for converting the analog current of the A.C. servo motor into the digital current, a gate array 33, a ROM (Read Only Memory) 34, an interface IC 35 and a RAM (Random Access Memory) 36.

On the main circuit printed circuit board 23, there are mounted the main circuit components such as the current limiting resistor connected between the output terminal P of the diode rectifier 43 for converting the A.C. form to the D.C. form and the terminal P1, the ballast capacitor 25 connected between the terminals P1 and N and the two current detectors 11 for detecting the current of the A.C. servo motor 1, and also a switching transformer 27, an IC 29 for the switching power source, a drive circuit for driving the signal, which has been outputted from the PWM control computing unit, using a driver IC 28, an interface IC 30 for exchanging the interface with the main circuit, and the like which constitute the control power source circuit. In such a way, the various kinds of IC devices and components are mounted on the logic printed circuit board 19 and the main circuit printed circuit board 23 shown in Fog. 4, and for the lead pitches of those IC, LSI, VLSI, gate array, and ASIC, the high density package having the lead pitch of about 0.5 to 0.8 mm is adopted.

Next, the description will hereinbelow be given with respect to the operation in the case where the dust and the cotton dust have been adhered to the lead terminals of the IC which is mounted on the printed circuit board and the moisture is bedewed together with the dust and the cotton dust so that the adjacent lead terminals are electrically short circuited. Considering the case where the adjacent lead terminals are electrically short circuited, while the adjacent lead terminal is at the logic power source voltage of 5V (at the fixed electric potential of the high level H), or at the common 0V (at the fixed electric potential of the low level L), or it is another signal line (the electric potential H and the electric potential L are mixedly present), simply the description will now be given with respect to the case where the logic power source voltage of 5V (fixed to the electric potential H) and the common 0V (fixed to the electric potential L) are present.

The discussion will now be given with respect to the operation in the case where the electrical short circuit occurs on the line at 0V which is, in general, common to the signals of the automatic control loop having the feedback. When in FIG. 1, the position feedback signal θf, the velocity feedback signal Nf and the current feedback signal If which are all the feedback signals on the minus side of the summing points 12-1 to 12-3 electrically short circuit with the 0V line at the common electric potential, the feedback control is carried out in such a way that in response to the command signals θref, Nref and Iref, the actual position, velocity and current (torque) follow the command values, respectively.

First of all, when the position feedback signal θf of the position control loop electrically short circuits with the θV line, it is judged that the A.C. servo motor 1 has not yet reached the command position though in actual, the A.C servo motor 1 has already reached that position, and as a result, the acceleration is made. However, since the position feedback signal electrically short circuits with the 0V line, the information relating to the proper position is not fed back and as a result, the acceleration is continuously made to cause the run away. However, if the current control loop is properly operated, then the current of the A.C. servo motor 1 is limited to level equal to or lower than the maximum value and hence the external protection apparatus 18 is operated. Therefore, the A.C. servo motor 1, the encoder 2 and the A.C. servo motor controller 20 can be all prevented from being broken down at all.

Next, when the velocity feedback signal Nf of the velocity control loop electrically short circuits with the 0V line, it is judged that the velocity of the A.C. servo motor 1 has not yet reached the command velocity though in actual, the velocity of the A.C. servo motor 1 has already reached that velocity to increase the velocity of the A.C. servo motor 1. However, since the velocity feedback signal electrically short circuits with the 0V line, the information relating to the proper velocity is not fed back and as a result, the velocity is continuously increased to cause the run away. In this case as well, if the current control loop is properly operated, then the current of the A.C. servo motor 1 is limited to the level equal to or lower than the maximum value. Therefore, the A.C. servo motor 1, the encoder 2 and the A.C. servo motor controller 20 can be all prevented from being broken down at all.

Next, when the current feedback signal If of the current control loop electrically short circuits with the 0V line, it is judged that the current of the A.C. servo motor 1 has not yet reached the command current though in actual, the current of the A.C. servo motor 1 has already reached that current to increase the current in an instant. However, since the current feedback signal electrically short circuits with the 0V line, the information relating to the proper current is not fed back and as a result, the current of the A.C. servo motor 1 is continuously increased to exceed the maximum current in an instant to become the overcurrent, and hence there is no time for accelerating the A.C. servo motor 1 to carry out the operation of protecting the over-current detection circuit so that each of the switching devices of the inverter main circuit interrupts its base and the A.C. servo motor controller 20 trips. At this time, the current which is caused to flow through each of the switching devices of the power module 22 is increased up to the large saturation current which is determined on the basis of the current amplification factor of each of the switching devices and as a result. the over-current detection circuit is operated to interrupt that current. At this time, the temperature in the inside of each of the switching devices has risen, and hence that situation is repeatedly caused in the state in which the internal temperature have not yet fallen, then the each of the switching devices will be broken down due to the thermal fatigue.

The response time in the position control loop and the velocity control loop is the acceleration/deceleration time for moving actually the machine. Then, the acceleration/deceleration time is in proportion to the sum of the moment of inertia of the A.C. servo motor 1 and the moment of inertia of the machine which is obtained in the term of the motor axis and also is in inverse proportion to the difference between the motor torque and the load torque. Therefore, the moment of inertia of the machine is related thereto and hence the responsibility is slow. In addition, as described above, in order to configure the stable control system which is less in the overshoot and the undershoot, the order of decreasing the responsibility is the current loop, the velocity loop and the position loop. Therefore, the design is made in such a way that the response time of the position loop and the velocity loop is made slower than that of the current loop. For this reason, an acceleration sensor, an over velocity sensor and right and left-hand sides edge sensors which are mounted to the both ends of the operating range so as for the A.C. servo motor not to depart the operating range are provided in the machine, whereby the respective factors can be detected without any of the time delay and hence the machine can be protected. For example, the set makers manufacture the external protection apparatus 18 for the overall system including the electricity and the machinery, and the run away is prevented from being caused by the provision of the acceleration sensor 14 and the over velocity sensor 15 which are installed on the machine side, and the right and left-hand sides edge sensors 16 which are mounted to the both ends of the operating range, whereby the machine can be protected. Therefore, it is possible to protect the A.C. servo motor 1.

In addition, the discussion will hereinbelow be given with respect to the operation in the case where the electrical short circuit occurs in the 5V line on which the level of each of the signals in the loops in the feedback system becomes the level H.

When the position feedback signal 0f, the velocity feedback signal Nf or the current feedback signal If which is added on the minus side of one of the summing points 12-1 to 12-3 electrically short circuits with the 5V line at the level H, i.e., the maximum value in the positive direction, the feedback control is carried out in such a way that in response to the command signals ref, Nref and Iref, the actual position, velocity and current (torque) follow the command values, respectively.

First of all, in the position control loop, since though the A.C. servo motor 1 has actually already reached the specified position, the information relating to the positive maximum position is fed back, it is judged that the A.C. servo motor 1 has already been rotated beyond the specified position, and hence the acceleration is made in the reversing direction. However, since the position feedback signal electrically short circuits with 5V line at the level H, the information relating to the proper position is not fed back and hence the acceleration is continuously made in the reversing direction to cause the run away.

Next, in the velocity control loop, it is judged that though in actual, the velocity of the A.C. servo motor 1 has already reached the command velocity, the velocity of the A.C. servo motor 1 has exceeded that velocity to reach the maximum velocity, and as a result, the velocity of the A.C. servo motor 1 is decelerated to be accelerated in the reversing direction. However, since the velocity feedback signal electrically short circuits with the 5V line, the information relating to the proper velocity is not fed back and hence the acceleration is continuously made in the reversing direction to cause the run away state. However, if the current control loop is properly operated similarly to the case where the feedback signal electrically short circuits with 0V line, then the current of the A.C. servo motor 1 is limited to the level equal to or lower than the maximum value, and hence the A.C. servo motor 1, the encoder 2 and the A.C. servo motor controller 20 can be all prevented from being broken down. In addition, the external protection apparatus 18 for the overall system is manufactured, and the acceleration sensor 14, and the over velocity sensor 15 which are installed on the machine side, and the right and lefthand sides edge sensors 16 which are mounted to the both ends of the operating range are provided, whereby the run away is prevented from being caused to ensure the safety and to protect the machine. Therefore, it is possible to protect the A.C. servo motor 1.

Next, in the current control loop, it is judged that though in actual, the current of the A.C. servo motor 1 has already reached the command current, the current of the A.C. servo motor has reached the maximum current to decrease the current in an instant, and even when has exceeded the negative maximum current on the reverse polarity side, the current of the A.C. servo motor 1 is still increased. However, since the current feedback signal electrically short circuits with the 5V line, the information relating to the proper current is not fed back and hence the current of the A.C. servo motor 1 is continuously increased to the negative side to be the over current in an instant. If that situation is rapidly caused, then each of the switching devices will be broken down due to the thermal fatigue in an instant.

In this connection, the detection of the disconnection of the output lines to the magnetic poles positions sensor 2-1 and the rotational speed and position sensor 2-2 of the encoder 2, and the A.C. servo motor controller 20 is described in JP-U-62-44262. Then, the pulse encoder employing both of the reference pulse and the inverted pulse which is obtained by inverting the reference pulse is used, and the detection of the disconnection is carried out on the basis of the exclusive OR of both of the pulses on the reception side. As a result, upon the disconnection of the encoder output lines from the encoder 2 to the A.C. servo motor controller 20, the disconnection is detected in an instant, and hence it is impossible to cause the run away of the machine at all.

Next, the description will hereinbelow be given with respect to the case where the electrical short circuit occurs with the line at the level L or H on the forward element side from the summing points 12-1 to 1203 shown in FIG. 1.

When the output of the position control computing unit 3 or the velocity control computing unit 5 electrically short circuits with the line at the level L, the velocity command Nref or the current command Iref becomes zero in the level. When the output of the position control computing unit 3 electrically short circuits therewith, the velocity of the A.C. servo motor is decelerated so that the A.C. servo motor is stopped. In addition, when the output of the velocity control computing unit 5 electrically short circuits therewith, the A.C. servo motor becomes the free run state and hence is not broken down at all.

Next, when the electrical short circuit occurs with the line at the level H, the level of the each of the velocity command Nref and the current command Iref becomes the level H. When the output of the position control computing unit 3 electrically short circuits with the line at the level H, the A.C. servo motor is run at the maximum velocity, and while when the output of the velocity control computing unit 5 electrically short circuits with the line at the level H, the maximum current is caused to flow through the A.C. servo motor to accelerate the velocity of the A.C. servo motor, the A.C. servo motor can be protected by the operation of the external protection apparatus 18.

Next, let us consider the case where the output of the current control unit 7 electrically short circuits with the line at the level L or H, if the output of the current control unit 7 electrically short circuits with the line at the level L, then the A.C. servo motor becomes the free run state, while if the output of the current control unit 7 electrically short circuits with the line at the level H, then the level of the voltage command becomes maximum, and the current exceeds the maximum current to be the over-current so that the A.C. servo motor trips. At this time, the temperature in the inside of each of the switching devices has risen, and hence if that situation is repeatedly caused in the state in which the internal temperature has not yet fallen, then each of the switching devices will be broken down due to the thermal fatigue.

In addition, when in the output of the PWM control computing unit 8, the electrical short circuit occurs between the adjacent pins, normally, for the PWM signal, the upper arm switching device and the lower arm switching device are alternately, repeatedly turned ON and OFF. Then, if the electrical short circuit occurs, then this short circuit becomes the arm short circuit which electrically short circuits across the ballast capacitor of the inverter circuit. In this case as well, if such a situation is repeatedly caused, then the each of the switching devices will be broken down due to the thermal fatigue.

From the foregoing, even if the dust and the cotton dust have been adhered to the lead terminals of the position control loop and the velocity control loop of the IC which is mounted on the printed circuit board and then the moisture is bedewed together with the dust and the cotton dust so that the electrical short circuit occurs between the adjacent lead terminals, then the current of the A.C. servo motor is controlled equal to or lower than the maximum current and hence the power module can be prevented from being broken down at all. If the printed circuit board is dried, then the A.C. servo motor may be run again in the normal state in some cases. However, at the time when the dust and the cotton dust have been adhered to the lead terminals of the current control loop of the IC and then the moisture is bedewed together with the dust and the cotton dust, the current of the A.C. servo motor 1 exceeds the maximum current in an instant. Therefore, if such a situation is repeatedly caused, then the power module will be broken down due to the thermal fatigue. For this reason, only the current control loop is most sensitive to the breakdown of the power module, and hence in the case where the associated printed circuit board is installed in the place having the bad circumstance and also the dew condensation is generated, there is the much dangerousness that the current control loop may be broken down.

In this connection, in accordance with the official gazette of JP-A-6-169578, since the printed circuit board is mounted on the power module and also the printed circuit board is not fixed thereto by epoxy resin, there is the possibility that the dust and the cotton dust are adhered between the lead terminals of the IC and the like and then the moisture is bedewed together with the dust and the cotton dust. For this reason, in the portion in which the lead pitch is small, the protection is not sufficient for occurrence of the electrical short circuit. In addition, in accordance with the official gazette of JP-A-9-229972, the microprocessor executes the processing of controlling the position, the processing of controlling the velocity, and the processing of controlling the current, and the current feedback data is transmitted through the data bus which is distributed among the data buses of other loops. Therefore, in the case where the dust and the cotton dust have been adhered to the microprocessor CPU, the A/D converter or the printed circuit board and then the moisture is bedewed together with the dust and the cotton dust, the devices are arranged in which the pitch of the lead terminals or the spacing between the conductor patterns on the printed circuit board is small, and hence the electrical short circuit may occur. This problem is not taken into consideration in the prior art at all.

JP-A-9-65662 teaches that a current sensor is provided for detecting the current flowing through a power semiconductor element, the current sensor is disposed together with a main circuit in a module, and the detected signal is outputted to an external circuit separate from the module. This document does not concern a short circuit in the current control system.

JP-A-4-304184 teaches separate two CPUs one of which controls the current control system and the other controls the speed control system. The data is interchanged between the CPUS. This document does not concern a short circuit in the current control system.

SUMMARY OF THE INVENTION

In the case of the general industrial machines, the control board in which the A.C. servo motor controller is accommodated is installed in the vicinity of the manufacture field or the processing field. Even if the dust protective construction may be adopted in order to prevent the dust and the cotton dust from entering into the control board, the door of the control board will be opened when carrying out the periodic check and the periodic inspection. Also, if the A.C. servo motor is operated for a long time period, then the dust and the cotton dust become to be adhered to the logic printed circuit board and the main printed circuit board of the A.C. servo motor controller provided in the control board. In addition, since when the humidity is increased in the rainy season, the dew condensation may occur on the printed circuit board in some cases, in the light of the foregoing, an object of the present invention is to remove the failure, which can not be restored, such as the breakdown of the A.C. servo motor and also to manufacture the high reliably products even in such a case as well.

In this case, the object of the invention is to prevent the breakdown, and if the machine is not broken down, then even granting that the abnormality occurs in the operation of the machine, the safety can be ensured by the external protection circuit. If the printed circuit board gets dry, then the A.C. servo motor is operated in the proper state again. Therefore, in the case where the external protection operation functions, if the cleaning is carried out to remove the dust and the cotton dust, then the A.C. servo motor can be operated properly as in the former state.

The means for solving the above-mentioned problems associated with the prior art is as follows.

(1) The electrically conductive portion of a feedback element of the feedback extending from a current detector to a summing point is hermetically encapsulated without being exposed to the external ambient atmosphere. As for one method therefor, that electrically conductive portion is mounted in a power module which is molded with resin such as epoxy resin and then is hermetically encapsulated in such a way as not to be exposed to the outside to which the dust and the cotton dust may be adhered. As a result, the current is detected in the inside of the power module.

(2) The electrically conductive portion of a forward element extending from a summing point of a current control unit to a gate terminal of each of switching devices is hermetically encapsulated without being exposed to the external ambient atmosphere. As for one method therefor, the electrically conductive portion of the forward element extending from the summing point of the current control unit to the gate terminal of each of the switching devices is mounted in the power module which is molded with resin such as epoxy resin and then is hermetically encapsulated in such a way as not to be exposed to the outside to which the dust and the cotton dust may be adhered. By hermetically encapsulating the electrically conductive portion with resin such as epoxy resin as described above, since the signals through the gate terminals GU, EU, GV, EV, GW, EW, GX, GY, GZ, GB and E can be managed as the signals in the inside of the power module, those terminals do not need to be provided as the terminals which are projected from the power module. Therefore, the gate terminals which are continuously arranged at a small pitch and the printed circuit board corresponding thereto do not need to have the lead terminals which are arranged at a small pitch, and hence the problem that the short circuit occurs due to the adhesion of the dust and the cotton dust can be solved.

(3) With the conventional centralized control in which the position control unit, the velocity control unit, the current control unit and the interface processing unit are concentratedly provided in one microprocessor, it is impossible to separate therefrom the current loop. Then, in the present invention, the current loop is separated from other units, i.e., the position control unit, the velocity control unit and the interface processing unit, i.e., the two portions are provided independently from each other to executed the distributed processing. For this reason, the current control loop including the current feedback is constructed in the form of another sub-microprocessor, and the associated devices are all mounted together with the sub-microprocessor in the power module which is molded with resin such as epoxy resin.

(4) The system clock signal is not made common to the main microprocessor and the sub-microprocessor, and the main microprocessor and the sub-microprocessor have separately the system clock signals due to the distributed processing.

(5) In addition, as for a form which is suitable as an embodiment of the present invention, in order to reduce the number of I/O terminals for the control signal of the power module, the signal is transmitted between the main microprocessor and the sub-microprocessor provided in the power module through the serial communication to minimize the number of I/O terminals. Then, for the I/O of the signal, there is taken the position of the signal where even if the electrical short circuit occurs between the adjacent lead terminals, the power module is not broken down, i.e., the location in which the separation is made on the basis of the current command (Iref). In this connection, the current command limiter is provided for the current command so that even if the excessive large voltage is inputted, the current becomes equal to or lower than the maximum current.

(6) In addition, as for a form which is suitable as an embodiment of the present invention, there is taken a form wherein for the magnetic pole positions data, the signal which has been outputted from the encoder is received by the main microprocessor and then is transferred to the power module through the serial communication. Since the computing is more rapidly carried out for the control computing period of the sub-microprocessor in the current control loop than that for the period of the position, velocity and interface processing, for the magnetic pole positions data, the interpolation of the computing period which is more rapid than the period of the main microprocessor is carried out by the sub-microprocessor to carry out the current control.

(7) Further, as for a form which is suitable as an embodiment of the present invention, there is provided the means for setting the control periods in such a way that the control period of the main processor becomes integral multiples of the control periods of the sub-microprocessor and for monitoring the time difference between the serial communication for transmitting the control information between the two microprocessors and the time for starting the control processing to change the control period in such a way that the time difference becomes fixed.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE EMBODIMENTS

While the present invention can be generally applied to a motor drive apparatus in which its control circuit includes a current control loop, for the sake of simplicity, first of all, the present invention will hereinafter be described in detail by taking as an example an embodiment of an A.C. servo motor controller.

Figure 5:
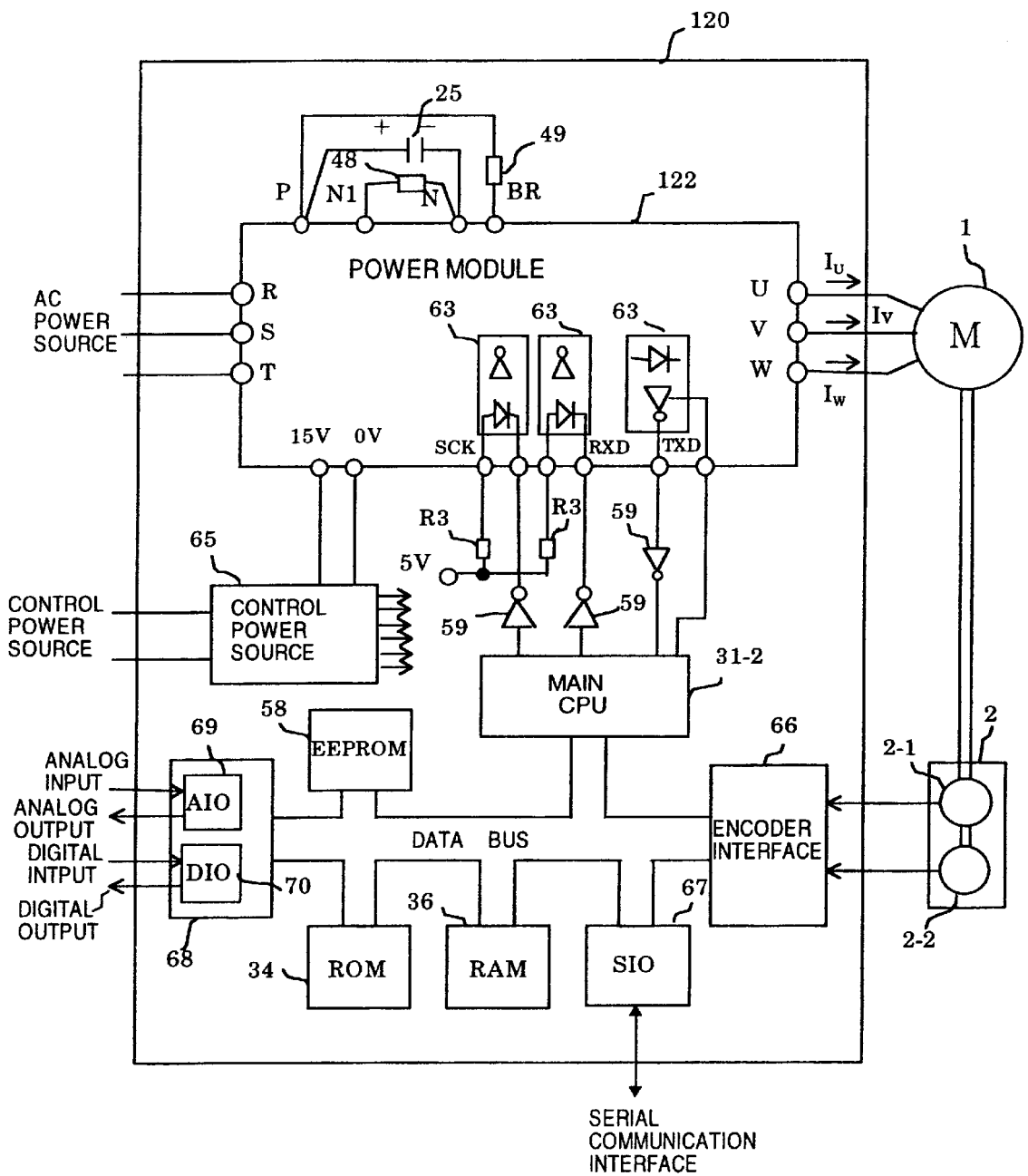
FIG. 5 is a circuit diagram, partly in block diagram, showing a configuration of an overall A.C. servo motor controller of an embodiment according to the present invention.
Figure 6:
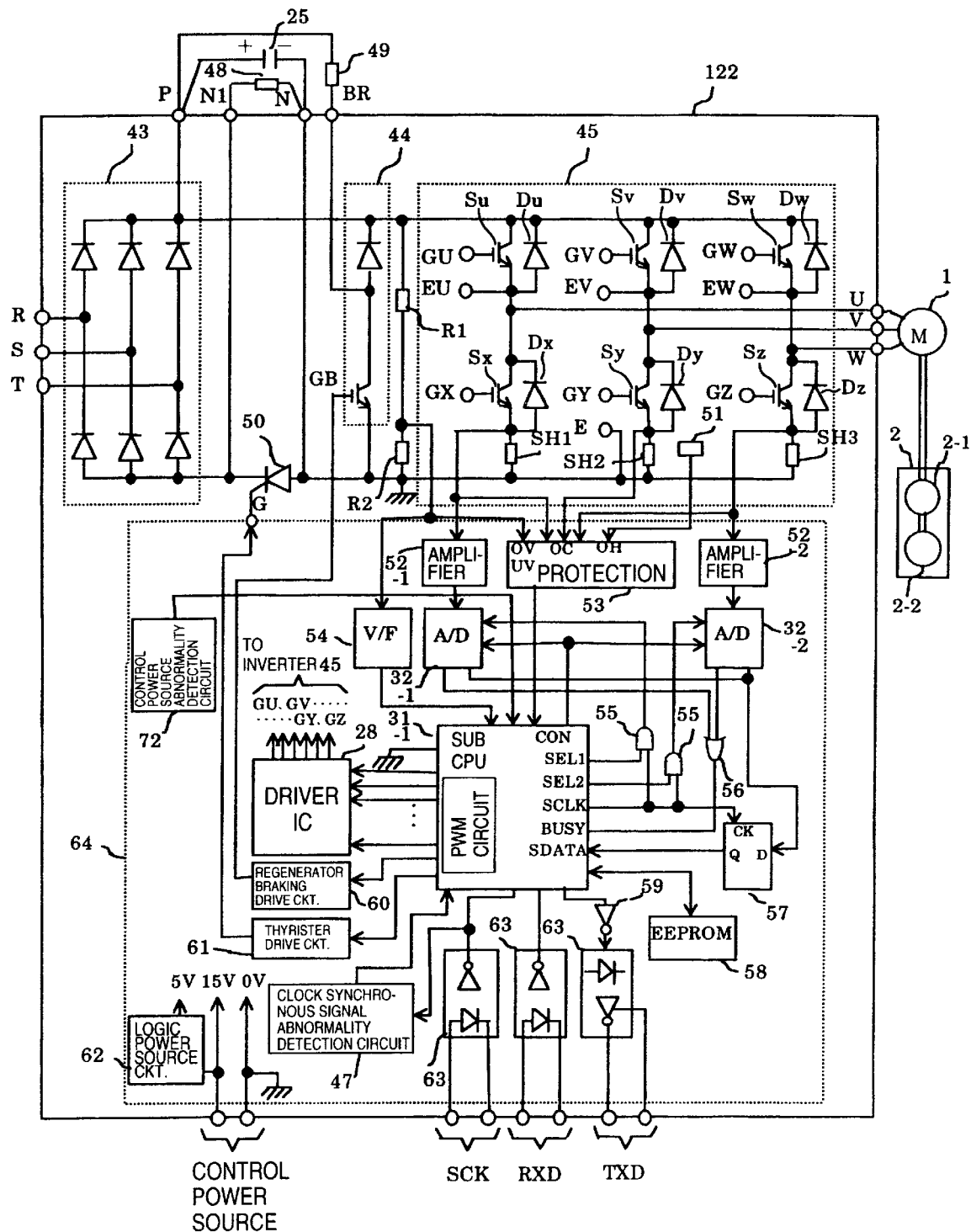
FIG. 6 is a circuit diagram, partly in block diagram, showing an internal configuration of a power module of the A.C. servo motor controller of the embodiment according to the present invention.

A configuration of an overall A.C. servo motor controller is shown in FIG. 5, and an internal configuration of a power module 122 (a unit for supplying the electric power) is shown in FIG. 6. In these figures, reference numeral 1 designates an A.C. servo motor, and reference numeral 2 designates an encoder which is self-contained in the A.C. servo motor 1 and which includes a magnetic pole positions sensor (rotor position sensor) 2-1 and a rotational speed and position sensor 2-2.

Reference numeral 31-2 designates a main microprocessor (CPU) which serves to transmit/receive a signal to/from a position control unit, a velocity control unit or an external interface. An external interface circuit 68 includes an analog I/O interface (AIO) 69, a digital I/O interface (DIO) 70, a serial communication interface (SIO) 67, and an encoder interface circuit 66 through which signals of the magnetic pole positions sensor 2-1 and the rotational speed and position sensor 2-2 are inputted from the encoder 2. In addition, in the peripheral portion of the main microprocessor 31-2, there are provided a ROM (Read Only Memory) 34, a RAM (Random Access Memory) 36, a non-volatile memory (EEPROM, Electrically Erasable and Programmable ROM) 58, and the like. A switching power source circuit 65 receives, as its input, the control power source voltage from the outside to supply the logic power source voltage for the main microprocessor 31-2 and the like, the control power source voltage for the analog circuit, the encoder power source voltage which is supplied to the encoder, and the power module logic voltage 15V which is supplied to the logic circuit of the power module 122. In this connection, the digital I/O interface 70 and the serial communication interface 67 are, for the purpose of taking measures to cope with the noises, electrically insulated from the logic circuit of the main microprocessor 31-2. In addition, the power module logic power source voltages 15V and 0V are common, and 0V is the same as the electrical potential at a terminal N from the inverter circuit. In this connection, the voltages 15V and 0V are electrically insulated from other power source voltages. The transmission of the signal between the main processor 31-2 and the power module 122 is carried out through the serial communication. Then, a serial communication synchronous clock SCK and first serial data RXD are transmitted from the main microprocessor 31-2 to the power module 122 through the inverter gate 59, while second serial data TXD from the power module 122 is received synchronously with the serial communication clock SCK by the main microprocessor 31-2. The signals of the serial data are transmitted through photocouplers 63 in which these signals are electrically insulated from each other.

A ballast capacitor 25 connected between the terminals P and N thereof, and a discharge resistor 49 connected between the terminals P and BR thereof constitute a part of the main circuit which is provided in the outside of the power module.

The detailed configuration of the power module 122 will now be described with reference to FIG. 6.

The three-phase A.C. power sources are respectively connected to terminals R, S and T and are each converted from the A.C. forms to the D.C. forms through a diode rectifier 43.

The current limiting resistor 48 is connected between the terminals N1 and N, and the ballast capacitor 25 is connected between the terminals P and N so that the rush current which is caused to flow through the ballast capacitor 25 at the time when turning ON the A.C. power source is limited by the current limiting resistor 48. After having charged the ballast capacitor 25 with the electric charges, in order to electrically short circuit the current limiting resistor 48, a thyrister is ignited to be the conducting state. The D.C. voltage which has been smoothed by the ballast capacitor 25 is supplied to an inverter circuit 45 which is constituted by the six sets of inverse parallel circuits consisting of switching devices Su, Sv, SW, Sx, Sy and Sz, and diodes Du, Dv, Dw, Dx, Dy and Dz to be used to drive the A.C. servo motor 1 which is connected to output terminals U, V and W, respectively.

In addition, the energy which has been regenerated from the A.C. servo motor 1 is temporarily accumulated in the ballast capacitor 25 connected between the terminals P and N. Then, at the time when the D.C. voltage has been increased up to a certain fixed voltage, the switching device of a regenerative braking circuit 44 is turned ON, and then that energy is consumed through the discharge resistor 49.

The regenerative braking circuit 44 detects the voltage which is obtained by dividing the voltage developed across the terminals P and N through resistors R1 and R2, and the voltage thus detected is subjected to the voltage-to-frequency (V/F) conversion in a V/F converter 54 to be inputted to the sub-microprocessor 31-1. Then, the period of the frequency thereof is measured to obtain the frequency to get to know the D.C. voltage on the basis of the relation between the voltage and the frequency of the V/F converter 54 and the relation of the division ratio of the resistors R1 and R2. At the time when the D.C. voltage has been increased up to a certain fixed voltage, the sub-microprocessor 31-1 sends an ON signal to a regenerative braking drive circuit 60 to cause the switching device of the regenerative braking circuit 44 to conduct. At the time when the regenerative energy has been consumed in the discharge resistor 49 to decrease the voltage developed across the terminals P and N, the sub-microprocessor 31-1 outputs an OFF signal to the regenerative braking device circuit 60.

The current of the A.C. servo motor 1 is detected on the basis of the voltages which are respectively developed across shunt resistors SH1 and SH2 for detecting currents which are arranged on the terminal N side of the inverter 45. Those voltages are respectively amplified by amplifiers 52-1 and 52-2 and then are converted into the digital signals at the simultaneous timing by two A/D (analog-to-digital) converters 32-1 and 32-2 each having a sample and hold circuit. Those digital signals are alternately transferred in a serial manner to the sub-microprocessor 31-1 through a D type flip-flop 57 to be inputted thereto. Those A/D conversion timing, data select and the operation of outputting the serial synchronous clock signal are all carried out by the sub-microprocessor 31-1.

On the basis of the current command data Iref which has been sent from the main microprocessor 31-2 and the values which have been respectively detected by the two A/D converters 32-1 and 32-2, the sub-microprocessor 31-1 computes the difference (Iref–If) between the current command Iref and the current feedback If and then carries out the current control computing, and the PWM control computing to output the six PWM signals to a driver IC 28. In the driver IC 28, the level conversion of the six switching devices of the inverter circuit 45 is carried out and also the six switching devices of the inverter circuit 45 are driven.

A protection circuit 53 of the inverter main circuit portion carries out the detection of an overvoltage 0 V of the inverter D.C. voltage developed across the terminals P and N, the detection of a under-voltage UV developed across the terminals P and N, the detection of an over-current OC flowing through the upper and lower arms by the shunt resistors SH1, SH2 and SH3 for detecting the currents of the inverter, and the detection of the overheating OH in each of the switching devices based on the detection of the rising of the temperature in the vicinity of each of the switching devices to output the resultant signals to the sub-microprocessor 31-1. For these detecting operations, the sub-microprocessor 31-1 interrupts urgently the PWM signal for the driver IC 28 to make the A.C. servo motor 1 freely run, and thereafter reports the alarm contents to the main microprocessor 31-2. The non-volatile memory 58 is employed to store therein, even when the power source is turned OFF, the data relating to a wire wound resistor of the A.C. servo motor 1, the inductance, the induced voltage constant, the output, the rating, the maximum number of revolutions, the maximum torque, the number of poles, the encoder resolution, the proportion of the current control, the integration constant and the like. When the power source is turned ON next time, the above data is read out from the non-volatile memory 58 to be used in the normal control.

With respect to the communication with the main microprocessor 31-2, the main microprocessor 31-2 receives the serial communication synchronous clock SCK and the first serial data RXD through the photo-couplers 63 in which the clock SCK and the data RXD are electrically insulated from each other. In addition, the second serial data TXD such as the alarm data and the data from the status monitor is transmitted synchronously with the serial communication clock SCK through an inverter gate 59 and the photo-coupler 63.

A circuit 47 for detecting the abnormality of the clock synchronous signal measures, at the time when the level of the serial communication synchronous clock SCK has been fixed to the level "L", that time period to detect the abnormality to interrupt the output signal of the inverter circuit. In addition, a circuit 72 for detecting the abnormality of the control power source voltage resets, at the time when the abnormality occurs in the power module control power source voltage 15V, 5V or 0V, the sub-microprocessor 31-1 to interrupt the operation of the seven switching devices of the inverter circuit 45 and the regenerative braking circuit 44.

Figure 7:
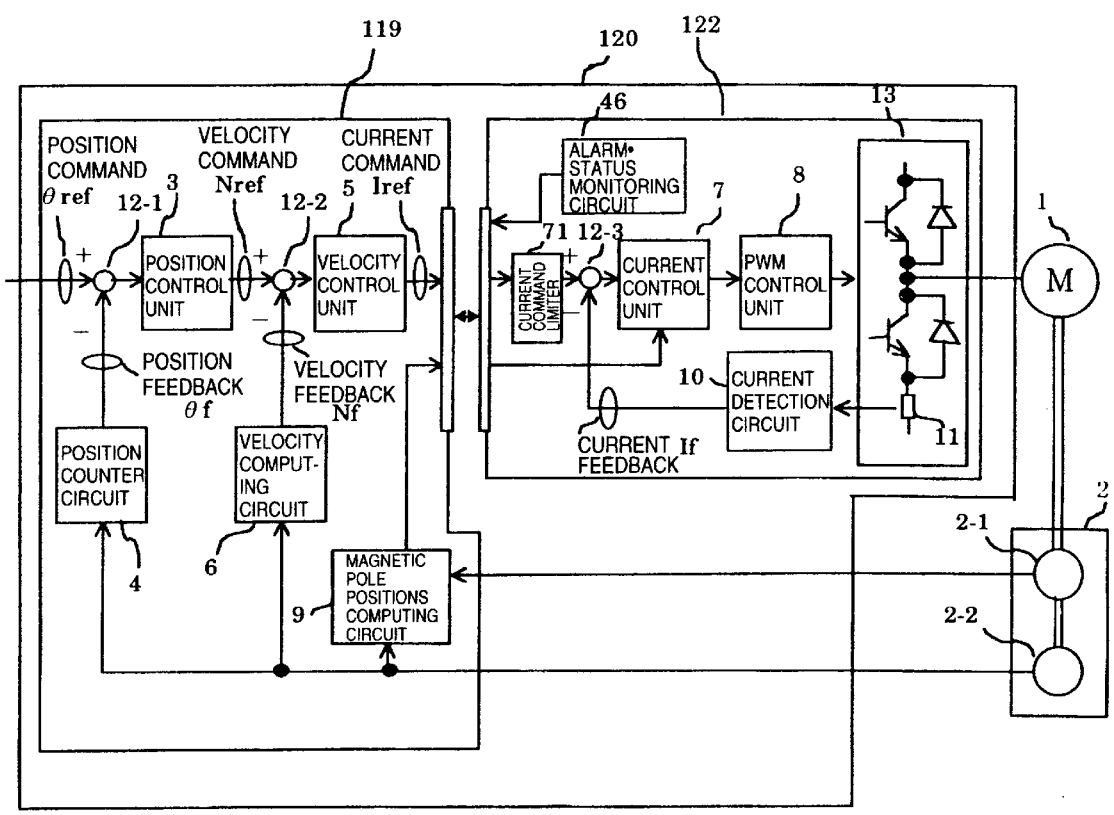
FIG. 7 is a control block diagram, partly in circuit diagram, showing a configuration of the A.C. servo motor of the embodiment according to the present invention.

FIG. 7 is a control block diagram, partly in circuit diagram, showing a configuration of the A.C. servo motor controller of an embodiment according to the present invention.

Figure 1:
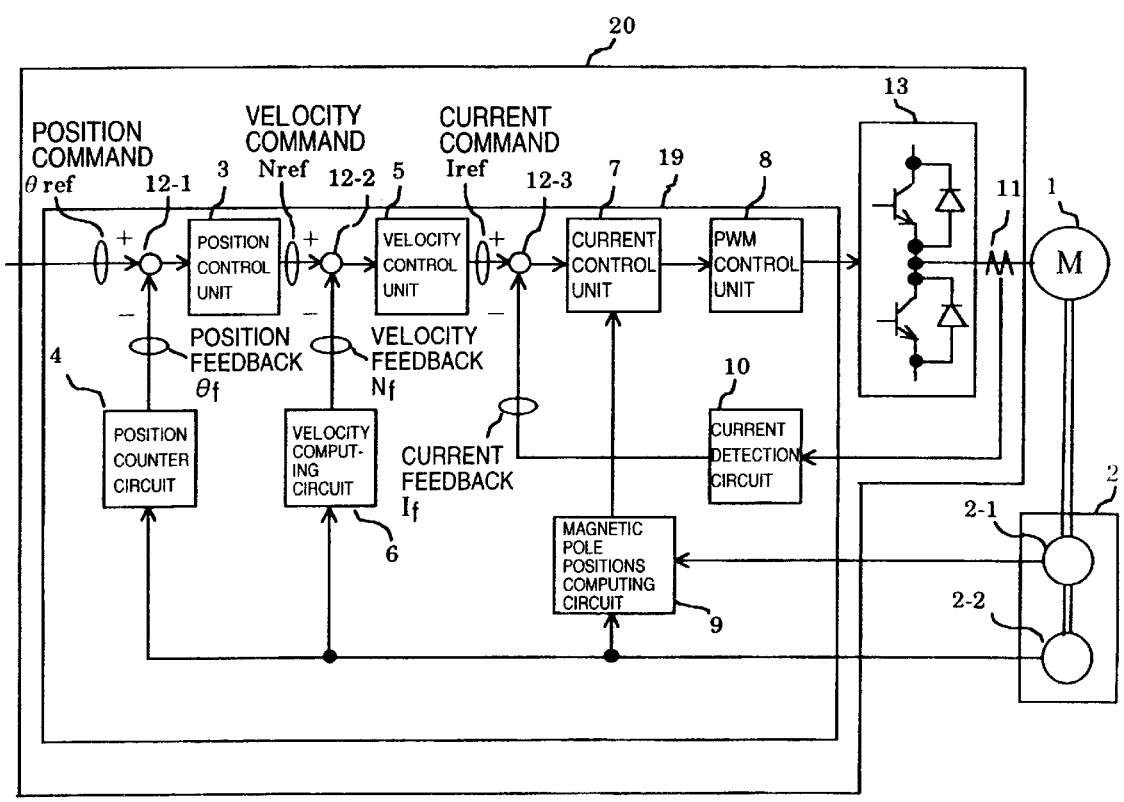
FIG. 1 is a control block diagram, partly in circuit diagram, showing a configuration of an A.C. servo motor of a conventional example.
Figure 2:
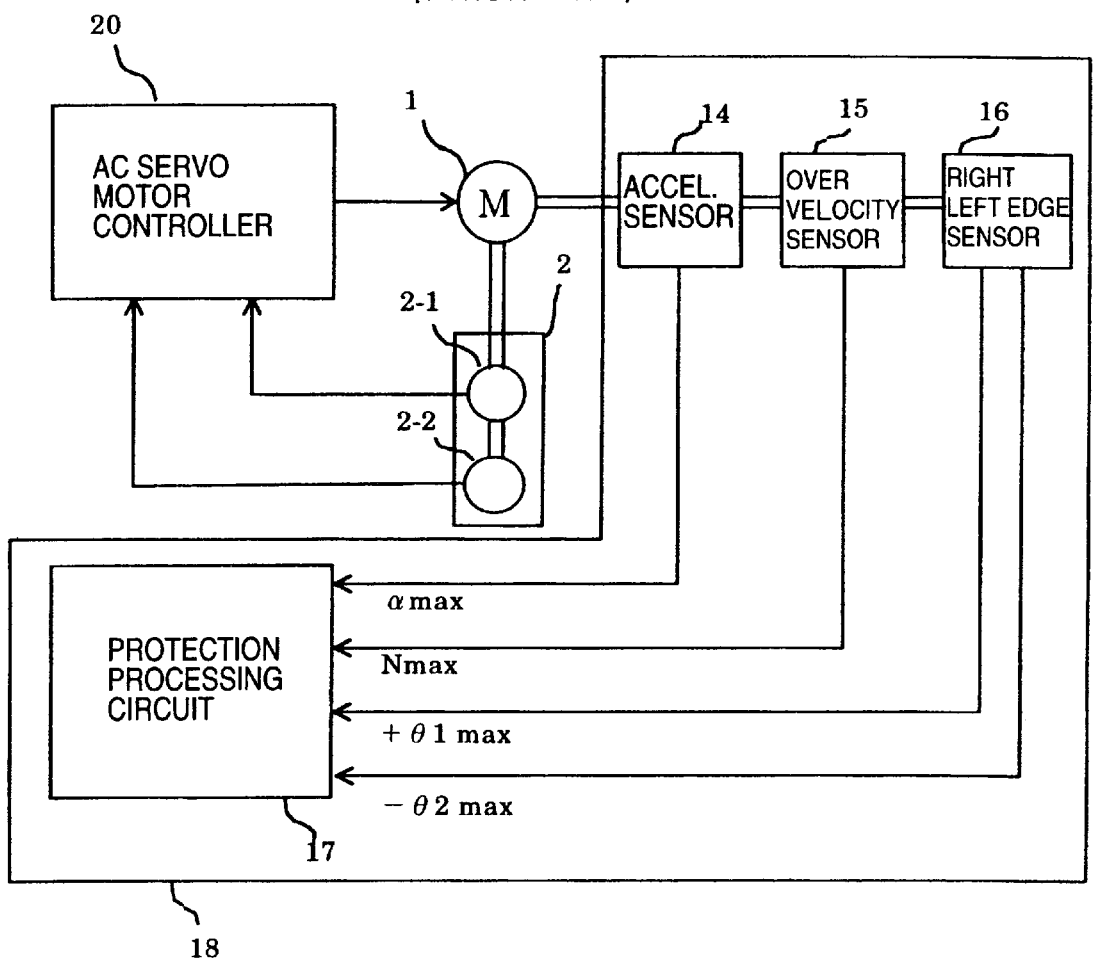
FIG. 2 is a block diagram showing a configuration of an example of a general external protection form.
Figure 3:
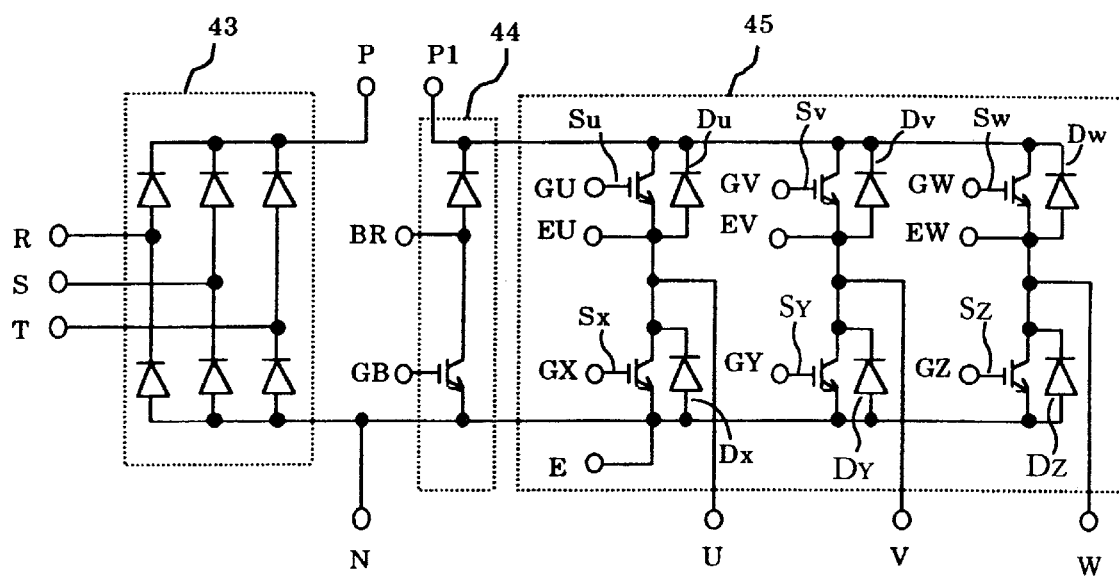
FIG. 3 is a circuit diagram showing an internal configuration of a power module of an A.C. servo motor controller of a conventional example.
Figure 4:
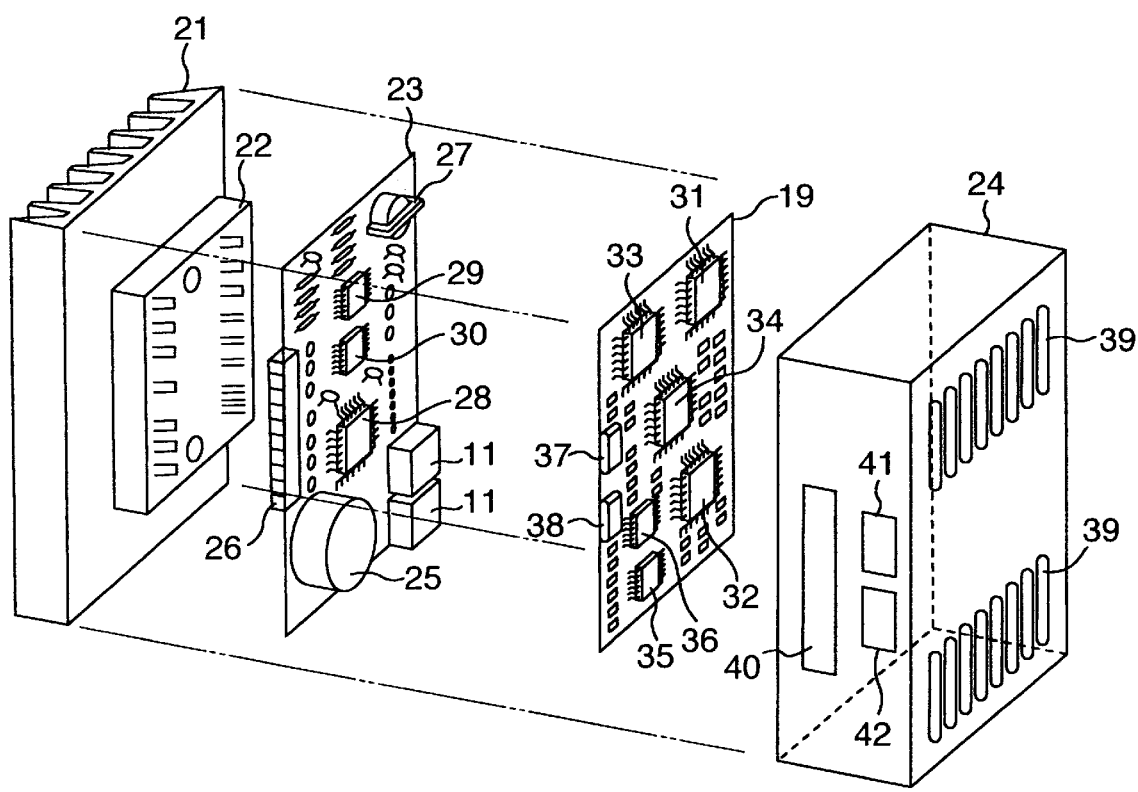
FIG. 4 is an exploded view showing the construction of the A.C. servo motor controller of the conventional example.

A point of difference from the control block diagram of FIG. 1 showing the conventional example is that the distributed processing is executed in the two systems, i.e., the current control system included in a power module 122, and a velocity and position control system (a host control unit) surrounded by the frame denoted by reference numeral 119. In the main microprocessor 31-2, the computing in the position control unit 3, and the velocity control unit 5, and the processing in the position counter 4, the velocity computing circuit 6 and the magnetic pole positions computing circuit 9 are carried out, and the current command Iref, the magnetic pole positions signal data and the like are transferred to the power module 122 through the serial communication.

In the sub-microprocessor 31-1 included in the power module 122, the current control unit 7, the PWM control unit 8, the current detection circuit 10, and the current command limiter 71 take partial charge of the control for the current control loop of the A.C. servo motor 1. Also, the switching devices of the inverter main circuit 13 are driven. In addition, the monitor data from the alarm status monitoring circuit 46 and the like is transmitted to the main microprocessor 31-2.

Next, the description will hereinbelow be given with respect to the operation of detecting the current in the present invention with reference to a time chart shown in FIG. 8.

Figure 8:
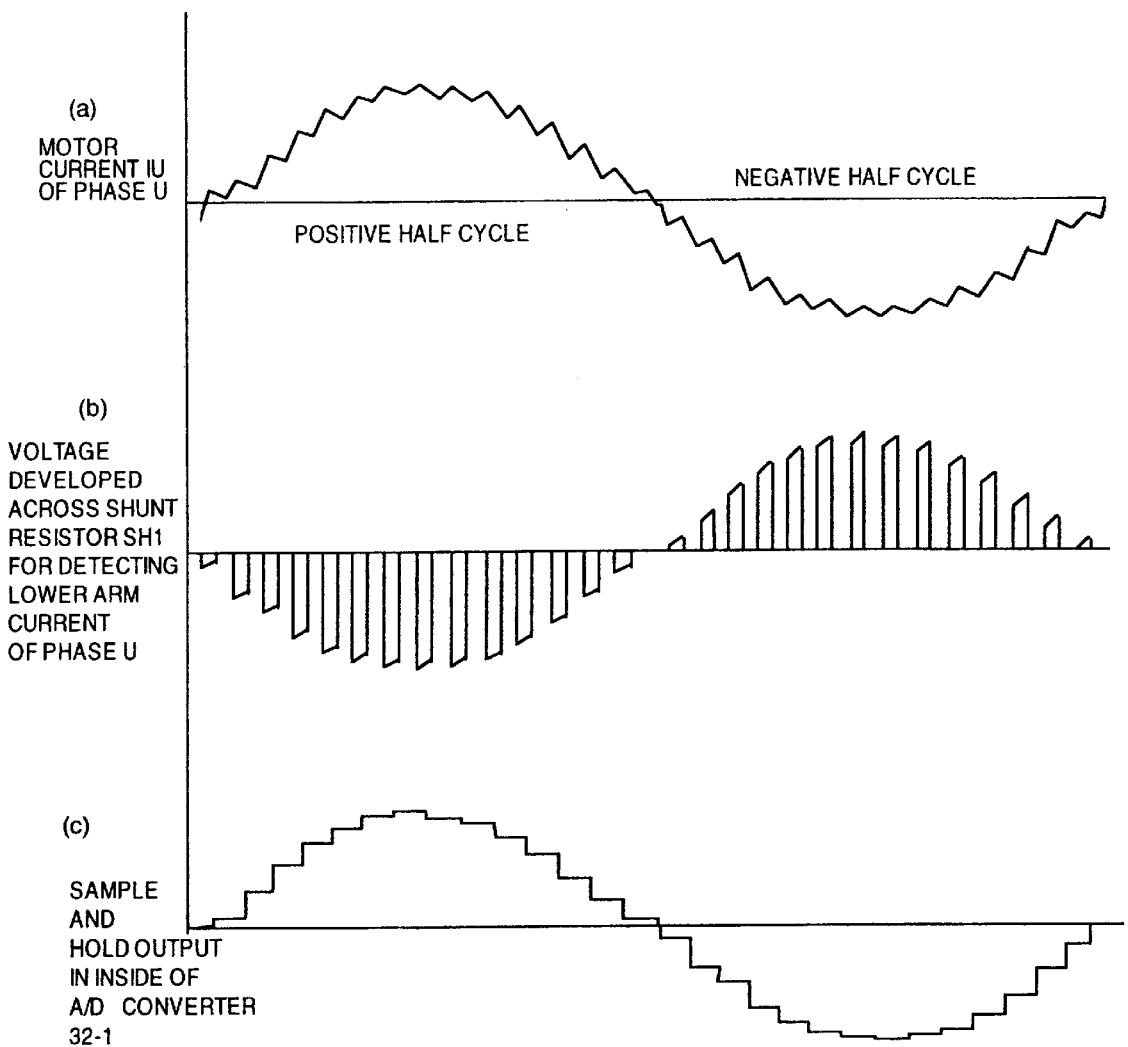
FIG. 8 is a time chart useful in explaining the current detection according to the present invention.

A part (a) of FIG. 8 shows the motor current of the phase U of the output from the inverter circuit 45 shown in FIG. 6 (with respect to the positive direction of the current, refer to an arrow of Iu shown in FIG. 5). The shunt register SH1 for detecting the motor current is inserted between the lower arm switching device and the terminal N. At the timing when the switching device of the lower arm is turned ON during the positive half cycle of the motor current of the phase U, no current is caused to flow through the switching device of the lower arm, but the current is caused to flow through the diode which is connected in parallel to that switching device. At this time, the current is caused to flow upwardly from the terminal N side through the shunt resistor SH1 for detecting the current. In addition, at the timing when the switching device of the lower arm is turned ON during the negative half cycle of the motor current of the phase U, the current is caused to flow through the switching device of the lower arm. At this time, the current is caused to flow downwardly to the terminal side through the shunt resistor SH1 for detecting the current. The voltage developed across the shunt resistor SH1 for detecting the current is shown in the form of a waveform in a part (b) of FIG. 8. The voltage developed across the shunt resistor SH1 is amplified by the amplifier 52-1 to be inputted to the A/D converter 32-1. The A/D converter 32-1 self-contains the sample and hold circuit, and a part (c) of FIG. 8 shows the waveform of the output signal of the sample and hold circuit self-contained in the A/D converter 32-1. In this connection, while the foregoing has been described with reference to only the phase U, this is also applied to the phase W. As apparent from FIG. 8, the motor current can be detected on the basis of the sample and hold through the shunt resistor for detecting the current of the lower arm.

Next, the description will hereinbelow be given with respect to a time chart of detecting the current of the A/D converter according to the present invention with reference to the internal configuration of the power module shown in FIG. 6.

Figure 9:
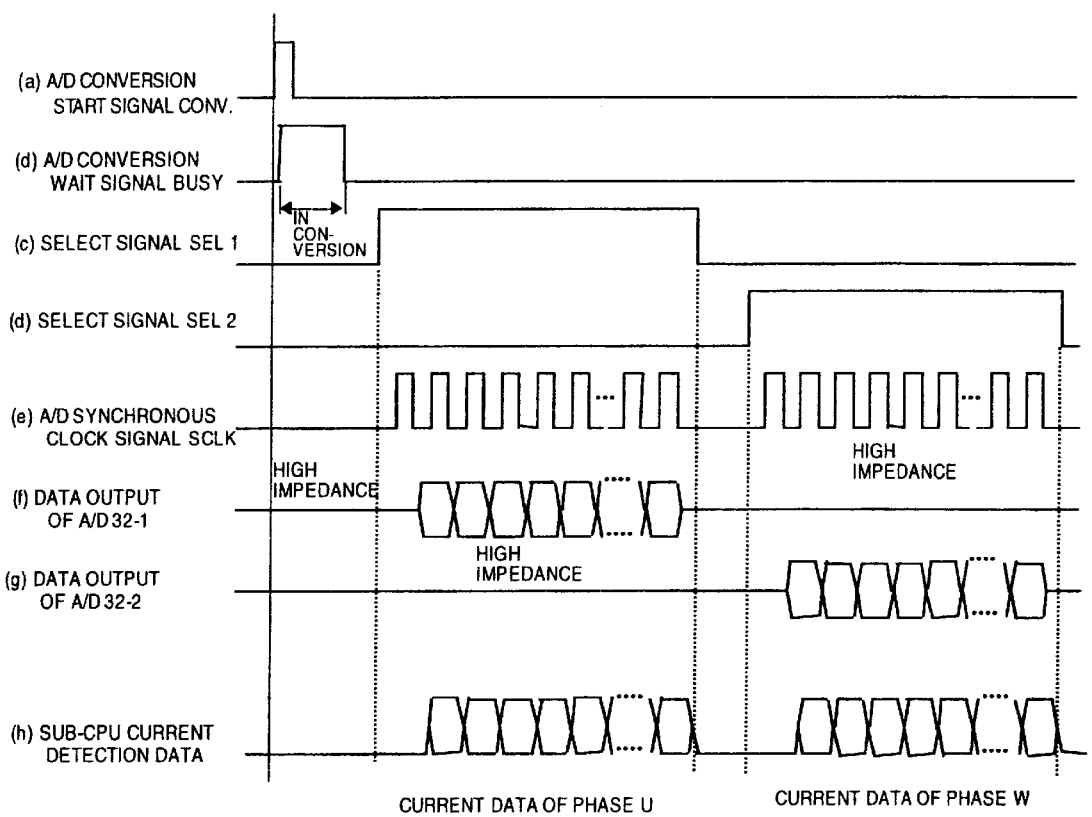
FIG. 9 is a time chart useful in explaining the detection of the A/D converter current according to the present invention.

A part (a) of FIG. 9 shows the waveform which is obtained when an A/D conversion start signal CONV is outputted from the sub-microprocessor 31-1 to each of the A/D converters 32-1 and 32-2. The signal CONV is outputted synchronously with the carrier frequency on the basis of which the signal PWM is generated, and on the basis of the rise signal, the A/D converters 32-1 and 32-2 sample and hold simultaneously the signals which have been respectively outputted from the amplifiers 52-1 and 52-2. Then, upon completion of sample and hold, the A/D conversion is started. During the A/D conversion, as shown in a part (b) of FIG. 9, the signals BUSY are respectively outputted from the A/D converters 32-1 and 32-2 and both of them are inputted to an OR gate 56 to obtain the logical OR to inform the sub-microprocessor 31-1 of that the signals are being A/D - converted. Upon completion of the A/D conversion, the level of the signal BUSY becomes the level L. Then, in order to receive the data from each of the A/D converters, the sub-microprocessor 31-1 outputs alternately a select signal SEL1 (a selection signal on the basis of which the A/D converter 32-1 is selected) and a select signal SEL2 (a selection signal on the basis of which the A/D converter 32-2 is selected) as shown in a part (c) and a part (d) of FIG. 9. Next, the sub-microprocessor 31-1 outputs a synchronous clock signal SCLK to obtain the logical AND of the above-mentioned select signal and the synchronous clock signal SCLK in an AND gate 55 to send the resultant signal to the associated A/D converter. The A/D converters 32-1 and 32-2 send the current data which has been obtained by the A/D conversion as shown in a part (f) and a part (g) of FIG. 9 synchronously with the synchronous clock signal SCLK in the form of the serial signal to a D type flip-flop 57 which outputs in turn the signal in exact timing therewith to a terminal SDATA of the sub-microprocessor 31-1. The current data which has been obtained by the A/D conversion is selected on the basis of the select signal SEL1 or SEL2 and then is inputted in the order of the current data of the phase U and the current data of the phase W as shown in a part (h) of FIG. 9 to complete the data transfer.

Next, the description will hereinbelow be given with respect to the serial communication established between the main microprocessor and the sub-microprocessor with reference to a time chart shown in FIG. 10. If it is assumed that the velocity control computing period in the main microprocessor 31-2 is tasr, and the current control computing period in the sub-microprocessor 31-1 is tacr, then in the case of the current control computing tacr, the more rapid processing is executed. This fact is already described above. In addition, since the distributed processing is executed, the system clocks of the main microprocessor 31-2 and the sub-microprocessor 31-1 are obtained from the separate crystal oscillators, and the respective processings are of the asynchronous style. A serial communication synchronous clock SCK is outputted, as shown in a part (a) of FIG. 10, from the main microprocessor 31-2 to the sub-microprocessor 31-1.

Figure 10:
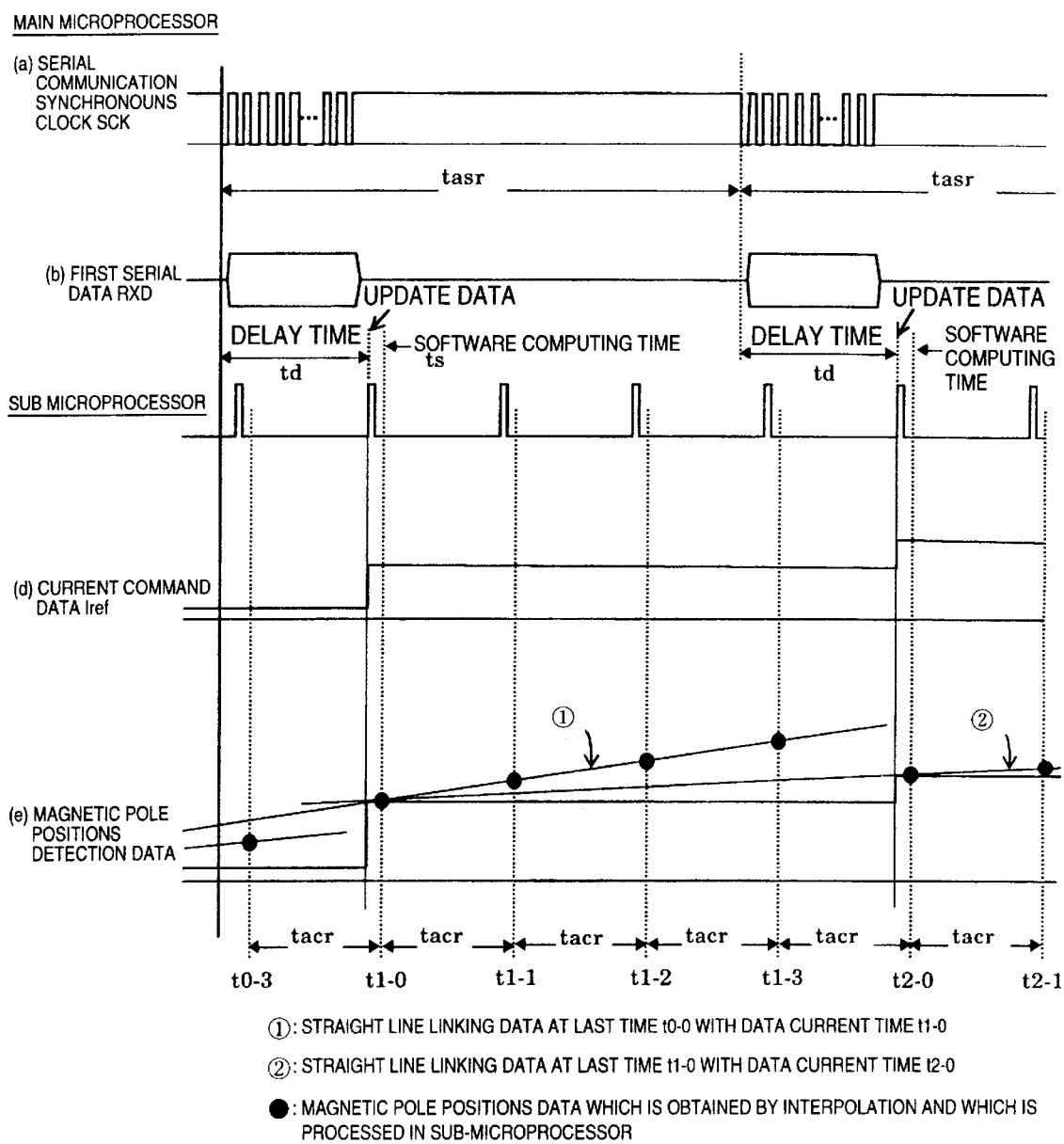
FIG. 10 is a time chart useful in explaining the serial communication established between a main microprocessor and a sub-microprocessor according to the present invention.

When no data transmission is carried out, the level of the serial communication synchronous clock SCK is at the level H and hence the state of interest is the wait state, while when the state of interest is the oscillation state, the first serial data RXD shown in a part (b) of FIG. 10 is sent synchronously with the serial communication synchronous clock SCK.

On the other hand, the sub-microprocessor 31-1 outputs, as shown in a part (c) of FIG. 10, the A/D conversion start signal CONV to the above-mentioned current detecting A/D converters 32-1 and 32-2 synchronously with the carrier frequency. For the current command Iref which has been sent from the main microprocessor 31-2 and the magnetic pole positions data of the A.C. servo motor, the transfer time is required to transfer the data and this is represented by a delay time td in FIG. 10. Therefore, the data update which is reflected in the sub-microprocessor 31-1 is carried out after a lapse of the delay time td. The time delay td is, as shown in a part (d) of FIG. 10, required to transfer the current command data Iref, and for the current control computing period tacr of the sub-microprocessor 31-1, the same data is used until the data is updated.

Next, since the magnetic pole positions detection data is updated at intervals of tasr by the main microprocessor 31-2, that data needs to be recomputed so as to correspond to the current control computing period tacr of the microprocessor 31-1. In a part (e) of FIG. 10, for the magnetic pole positions detection data, until the data is updated by the main microprocessor 31-2, the same data is not used, but the required data is obtained by the interpolation using a straight line ① in the figure. More specifically, when the data is updated at a time t1-0, the straight line which links the data at the last time t0-0 with the data at the current time t1-0 is lengthened, and then the data is interpolated in the manner as shown by the black symbols at times t1-1, t1-2 and t1-3 in order to carry out the control. Likewise, when the data is updated at a time t2-0, the straight line which links the data at the last time t1-0 with the data at the current time t2-0 is lengthened, and then the data is interpolated in the manner as shown at times t2-1 . . . in order to carry out the control.

In such a way, since the A.C. servo motor 1 is always rotated, if the fine control is carried out on the basis of the fact that the acceleration/deceleration is carried out with the same ramp as that of the last time of the magnetic pole positions data, then the A.C. servo motor 1 can be more smoothly run.

In addition, since the magnetic pole positions signal and the rotational speed and position signal of the encoder are not fed back to the power module side, but is fed back to the side of the velocity control unit and the position control unit and also the minimum number of I/O terminals is provided on the basis of the power module and the serial communication, the reliability is greatly improved against the adhesion of the dust and the cotton dust as well as the corrosion.

In this connection, ts is the value which represents the computing time delay required to convert the magnetic pole positions data into the computing period of the sub-microprocessor 31-1.

Figure 11:
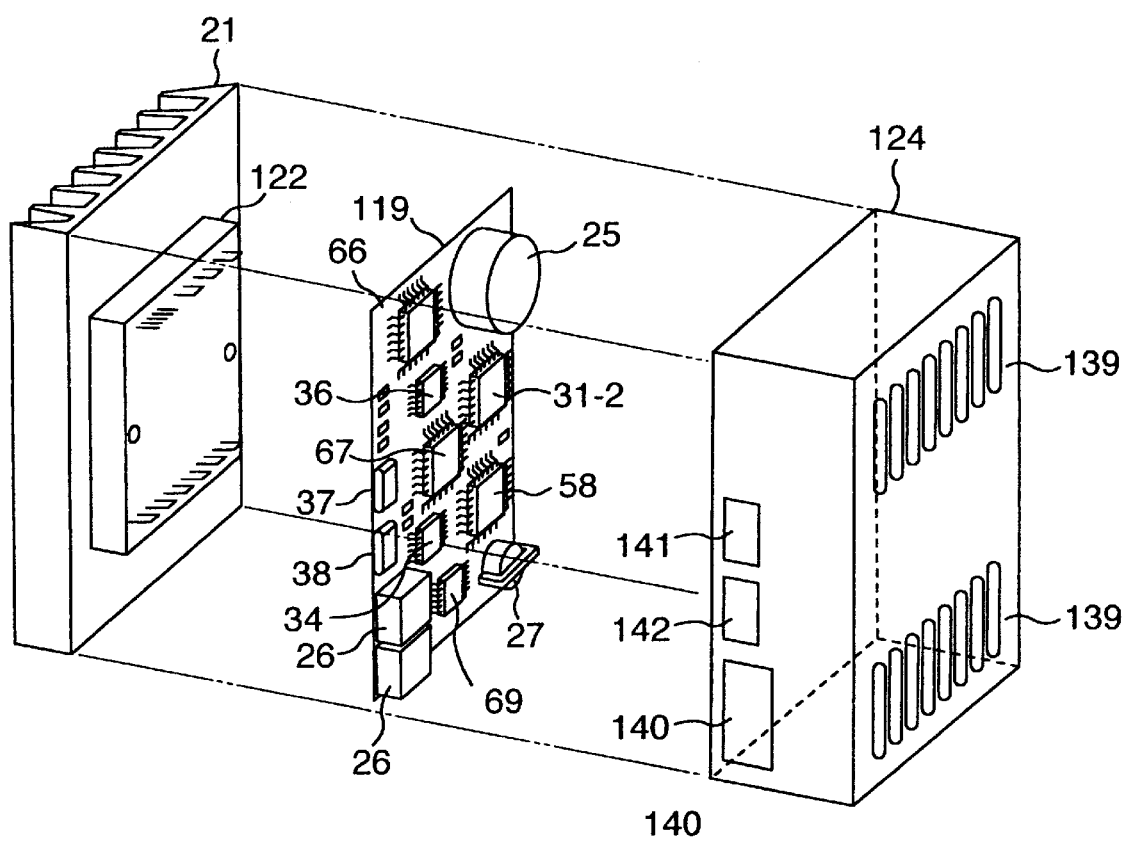
FIG. 11 is an exploded view showing the construction of the A.C. servo motor controller of the embodiment according to the present invention.

FIG. 11 is an exploded view showing the construction of the A.C. servo motor of the embodiment according to the present invention.

In the figure, reference numeral 122 designates a power module which self-contains the feedback element and the forward element of the current control feedback loop, the current command limiter and the like including the sub-microprocessor 31-1, the driver IC 28, and the current detecting A/D converters 32-1 and 32-2. This internal configuration is as shown in FIG. 6. The power module is mounted to the cooling fin 21 so that the heat generated therein can be exhausted to the outside through the cooling fin in the naturally-air cooling manner. To the printed circuit board 119, there are mounted the IC and the LSI such as the main microprocessor 31-2, the ROM 34, the RAM 36, the serial communication interface 67, the non-volatile memory 58 and the analog I/O interface 69, the ballast capacitor 25, the switching transformer 27, the main circuit connector 26 through which the A.C. power source and the motor output are connected to each other, an I/O connector 37, an encoder connector 38 and the like. Those devices and components are used to carry out the position and velocity control computing in the portion except the power module 122 shown in FIG. 6. Reference numeral 124 designates a cover with which the power module 122 and the logic printed circuit board 119 are both covered. Ventilating holes 139 are bored through the cover 124 so that the air which has been heated in the apparatus can be exhausted to the outside in the naturally-air cooling manner. In addition, through holes 140, 141 and 142 are formed in the front face in order to introduce therethrough a main circuit connector 26, an I/O connector 37 and an encoder connector 38 which are mounted to the logic printed circuit board 119. In such a way, the power module 122 self-contains the current control loop including the ICs, the LSIs, the gate array and the like which have the small lead pitches and which are hermetically encapsulated so as to be isolated from the external ambient atmosphere.

Figure 12:
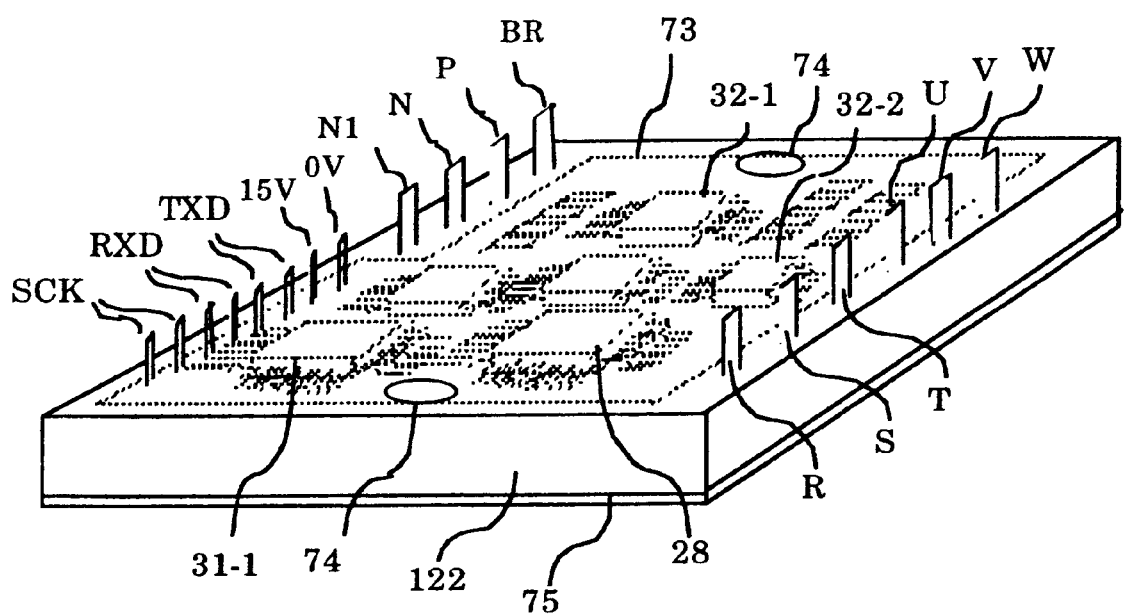
FIG. 12 is a perspective view showing the construction of the power module of the A.C. servo motor controller of the embodiment according to the present invention.

FIG. 12 shows the construction of the power module of the A.C. servo motor controller of the embodiment according to the present invention. The power module 122 employs a metallic base 75 which serves also to radiate the heat. After having formed an insulating layer (not shown) on the metallic base 75, the inverter main circuit 45 including the switching devices and the diodes, the shunt resistors SH1 to SH3 for detecting the respective currents, the regenerative braking circuit 44, the diode rectifier 43, the thyrister 50, the voltage dividing resistors R1 and R2, and the like are mounted thereon, and then a power module logic printed circuit board 73 is mounted therein. In FIG. 12, the arrangement of the devices and the components is shown by a dotted line. In addition, those devices and the components are insulatedly encapsulated with mold resin or the material corresponding thereto. In this power module logic printed circuit board 73, the devices and the components which are illustrated within the frame of the power module 64 shown in FIG. 6 are all mounted. Also, the terminals which are projected from the mold resin are numbered with the same codes as those with which the terminals in the frame 122 of FIG. 6 are numbered. Then, this module 122 is mounted to the cooling fin 21 of the inverter apparatus through a mounting hole 74.

Figure 13:
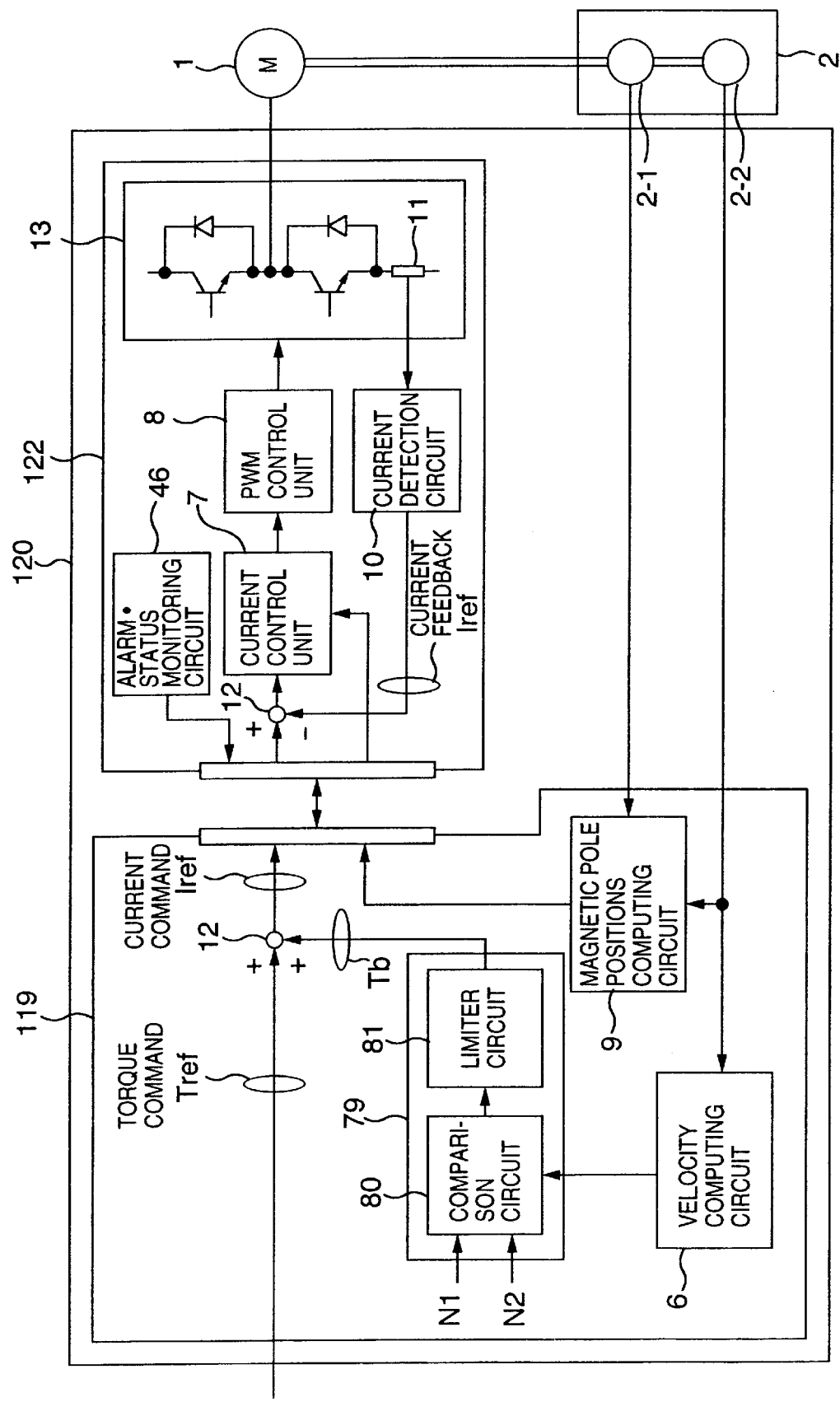
FIG. 13 is a control block diagram, partly in circuit diagram, showing a configuration of an A.C. servo motor of another embodiment according to the present invention.

FIG. 13 is a control block diagram, partly in circuit diagram, showing a configuration of an A.C. servo motor controller of another embodiment according to the present invention. In this A.C. servo motor controller, while the current control, loop of the power module 122 is the same in the configuration as that shown in FIG. 7, instead of the position control unit and the velocity control unit, the torque control unit is mounted on the logic printed circuit board 119.

When the tensile force of the winder is controlled, the torque control of the A.C. servo motor is required. In FIG. 13, a torque command Tref for the A.C. servo motor is transferred from the main microprocessor 31-2 to the sub-microprocessor 31-1 in the serial communication manner, and the current control is carried out in the power module 122.

Figure 14:
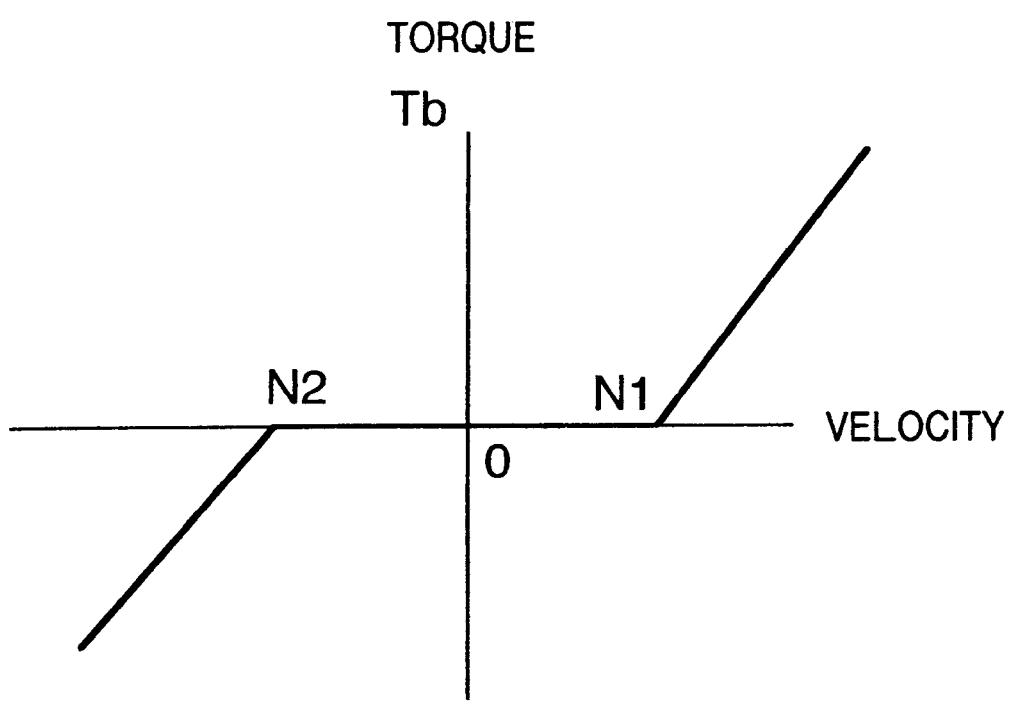
FIG. 14 is a graphical representation useful in explaining the velocity v.s. torque characteristics of the embodiment according to the present invention.

In the figure, reference numeral 1 designates an A.C. servo motor and reference numeral 2 designates an encoder which includes complexly a magnetic pole positions sensor 2-1 for detecting the positions of the magnetic poles of the rotor of the A.C. servo motor 1 and a rotational speed and position sensor 2-2 for detecting the rotational speed and position of the A.C. servo motor 1 and which is self-contained in the A.C. servo motor 1. Reference numeral 7 designates a current control unit and reference numeral 8 designates a PWM (Pulse Width Modulator) control computing unit, and these units 7 and 8 constitute the forward elements, respectively. Reference numeral 11 designates a current detector for detecting the current of the servo motor 1 which serves to detect the current from the lower arm of the inverter main circuit. The signal which has been obtained through the current detector 11 is sent to the current detection circuit 10 and then is negatively fed back at a summing point 12-3. Thus, the current feedback of the feedback element is constituted. The details thereof are the same as those which were described with reference to FIGS. 8 and 10, and hence the description thereof is omitted here for the sake of simplicity. Reference numeral 6 designates a velocity computing circuit which serves to monitor the velocity of the A.C. servo motor 1. Reference numeral 9 designates a magnetic pole positions computing circuit for receiving, as its inputs, the signals from the magnetic pole positions sensor 2-1 and the rotational speed and position sensor 2-2 of the rotor of the A.C. servo motor 1 to compute the magnetic pole positions. Reference numeral 79 designates a run away preventing circuit which includes a comparison circuit 80 and a limiter circuit 81. With respect to the characteristics of the limiter circuit 81, in the characteristics of the torque v.s. the velocity shown in FIG. 14, an output Tb of the limiter circuit 81 is zero in the interval ranging from the rotational speeds N1 to N2 as the torque control range and hence this does not influence upon a summing point 12-4 of the output Tb and the torque command Tref at all.

When the load torque is small for the torque command Tref and hence, for example, during the control of the tensile force of the winder, the material is snapped in two so that the winder becomes the run away state, when the rotational speed is out of the range from the rotational speed N1 to N2, if the comparison circuit 80 is operated so that the control is switched over to the velocity control of the proportional control to act as the velocity limiter, then the winder is prevented from being run away.

Figure 15:
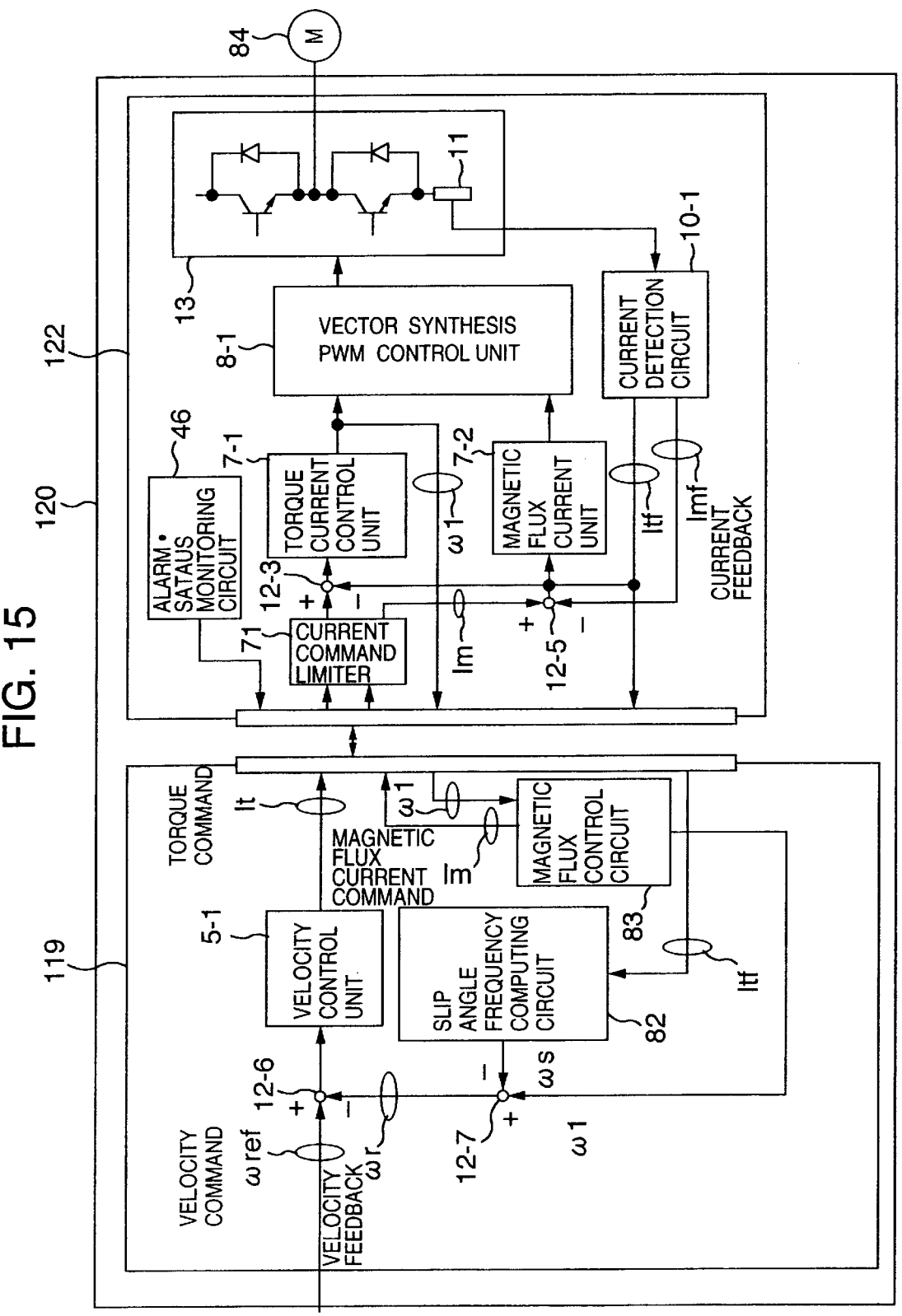
FIG. 15 is a control block diagram, partly in circuit diagram, showing a configuration of a vector inverter without a velocity sensor of an embodiment according to the present invention.

Next, FIG. 15 is a control block diagram, partly in circuit diagram, showing a configuration of a vector inverter without a velocity sensor of an embodiment according to the present invention. In the figure, reference numeral 84 designates an induction motor which includes no velocity sensor. A power module 122 has the two sets of current control loops. That is, a torque current control unit 7-1 for controlling the current which contributes to the torque, and a magnetic flux current control unit for controlling the current which intersects perpendicularly the current contributing to the torque are included in the two sets of current control loops. Then, these two units compute the respective currents. Reference numeral 8-1 designates a vector synthesis PWM control circuit for subjecting the output signals from the torque current control unit and the magnetic flux current control unit to the vector synthesis to carry out the PWM control and the resultant signal is sent to a driver 13, a control power source circuit and an inverter main circuit.

While the operation of detecting the current is similarly carried out to that shown in FIG. 13, the current feedback is converted into the D.C. amount of orthogonal components of the torque current component Itf and the magnetic flux current component Imf. The D.C. feedback currents are respectively compared with the two current commands as the output signals from the current command limiter 71, i.e., the torque current command It and the magnetic flux current component Im in the summing points 12-3 and 12-5 to constitute the negative feedback. Those control operations are carried out in the sub-microprocessor 31-1 in accordance with the command issued from the main microprocessor 31-2 which is mounted on the logic printed circuit board 119. The primary angle frequency ω1 of the input signal to the magnetic flux control circuit 83 is detected on the basis of the output signal from the torque current control unit 7-1 of the power module 122 and the signal relating to the resultant information is transmitted in the serial communication manner. The information relating to ω1 is inputted to the magnetic flux control circuit 83 which computes in turn a magnetic flux current command Im which is transferred in turn to the power module 122 again in the serial communication manner. A torque current feedback Itf which has been outputted from the current detection circuit 10-1 in the power module 122 is transferred to a slip frequency computing circuit 82 which outputs in turn a slip angle frequency ωs which is in proportion to the torque current feedback Itf to obtain the difference between the slip angle frequency ωs and the primary angle frequency ω1, thereby computing the velocity feedback ωr=ω1−ωs. The difference between the velocity command ωref and the velocity feedback ωr is computed at a summing point 12-6 and then the velocity control computing is carried out in the velocity control unit 5-1. The output signal from the velocity control unit 5-1 is transferred in the form of the torque current command It to the power module 122 in the serial communication manner, thereby forming the vector control without the velocity sensor.

Figure 16:
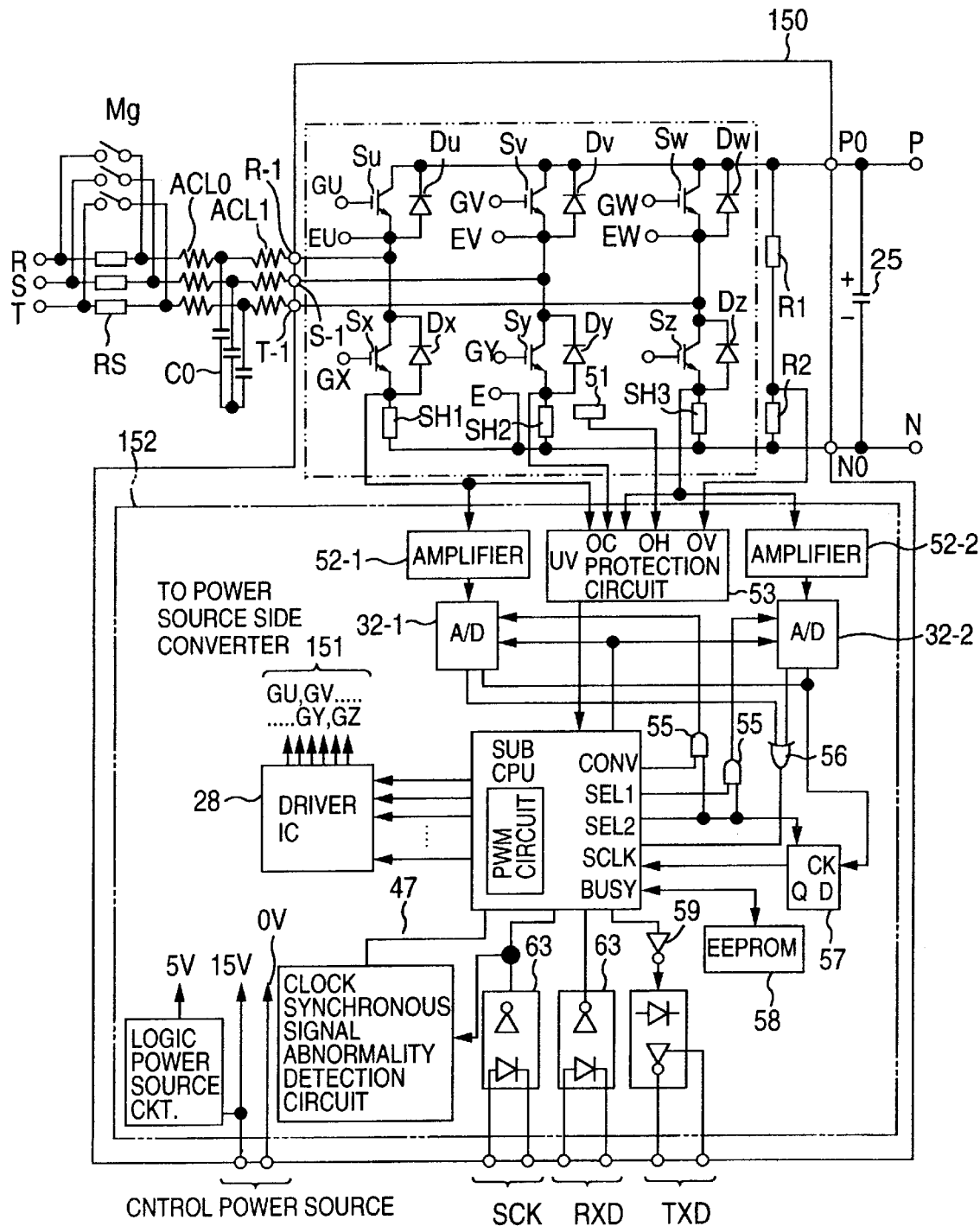
FIG. 16 is a circuit diagram, partly in block diagram, showing an internal configuration of a power source side converter controller of an embodiment according to the present invention.

FIG. 16 is a circuit diagram, partly in block diagram, showing an internal configuration of a power module of a power source side converter controller of another embodiment according to the present invention. At the time when turning ON the power source, the currents from the power source are inputted to A.C. power source terminals R, T and S to be rectified by the diodes of the power source side converter main circuit 151 through the current limiting resistor Rs, higher harmonics absorbing reactors ACL0, power source cooperative reactors ACL1 and then the ballast capacitor 25 is charged with the electric charges of these currents. After completion of the charge of the ballast capacitor 25 with the electric charges, electromagnetic contactors Mg are turned ON and thereafter, the electric power is supplied through the electromagnetic contactors Mg.

Next, the switching devices Su, Sv, Sw, Sx, Sy and Sz of the power source side converter main circuit 151 receive the ON/OFF signals through the gate terminals GU, GV, GW, GX, GY and GZ to start the PWM switching to carry out the boosting control in such a way that the output voltage developed across the terminals P and N becomes the fixed voltage to supply the electric power from the power source side terminals R, S and T to the load side terminals P and N. In addition, even in the case where conversely, the electric power is regenerated from the load side terminals P and N to the power source side terminals R, S and T through the power source side converter main circuit 151, the regenerated electric power is returned back to the power source in such a way that the voltage developed across the terminals P and N becomes the fixed voltage, i.e., the regenerative operation is carried out.

In this connection, while conventionally, the A.C. side currents through the power source side terminals R-1, S-1 and T-1 are detected by a current transformer CT to carry out the current feedback, in the present embodiment, similarly to FIG. 6, the A.C. side currents through the terminals R-1, S-1 and T-1 are detected on the basis of the voltages developed across the shunt resistors SH1 and SH2 for detecting the currents on the terminal N side of the power source side converter main circuit 151. The operation of detecting the current is the same as that in the time chart shown in FIG. 8, and in the time chart of detecting the A/D converter currents shown in FIG. 9, and the current feedback circuit is self-contained in the power module 150. In this connection, while in the A.C. servo motor 1, the magnetic pole positions are detected by the main microprocessor 31-2 rather than the encoder, as the procedure as well instead thereof, it is similar thereto that the power source voltage phase is detected by the main micro-processor 31-2 and then is obtained by the interpolation in the sub-microprocessor 31-1.

Figure 17:
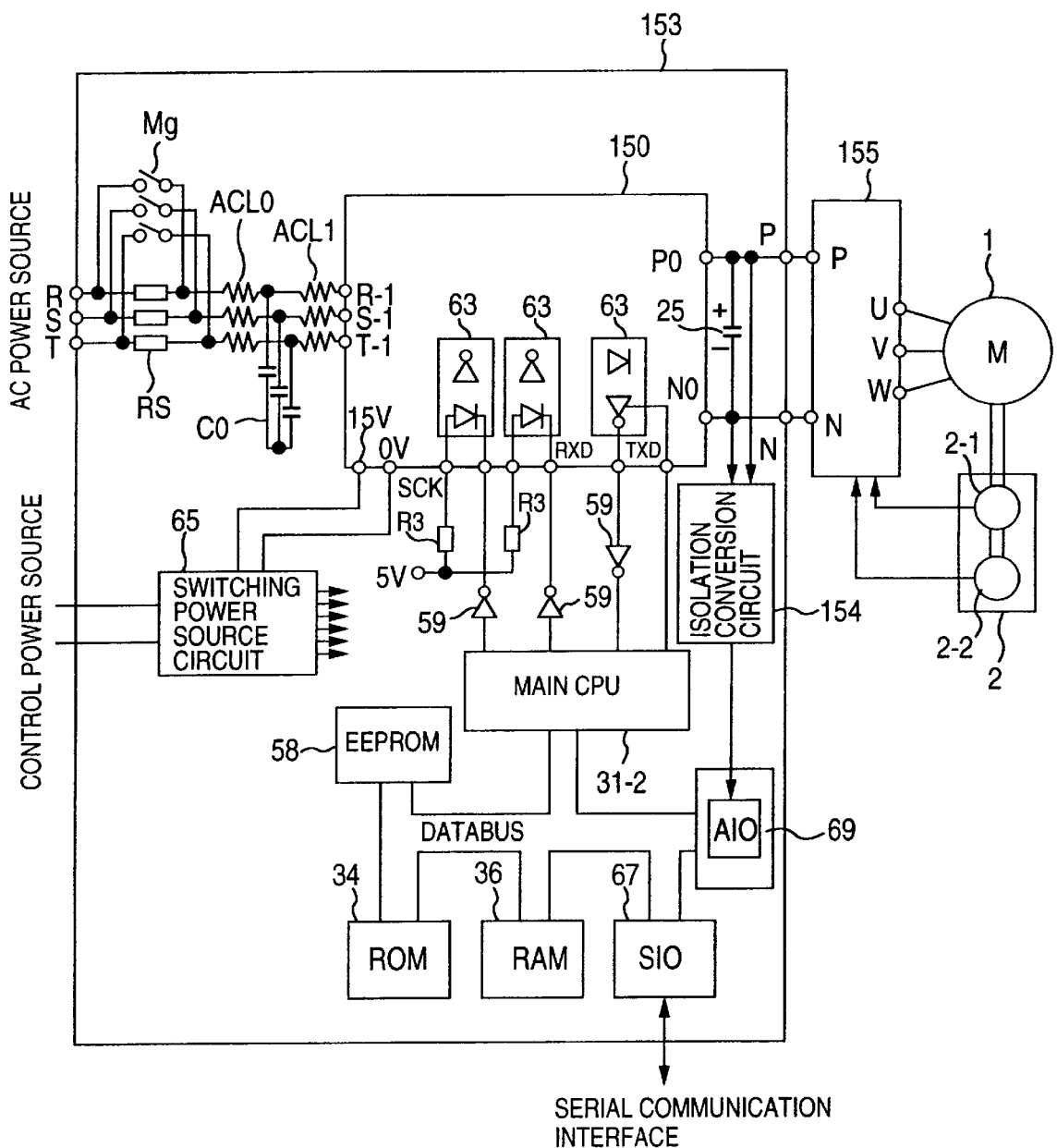
FIG. 17 is a circuit diagram, partly in block diagram, showing a configuration of an overall power source side converter controller of the embodiment according to the present invention.

FIG. 17 is a circuit diagram, partly in block diagram, showing a configuration of an overall power source side converter controller of an embodiment according to the present invention. An A.C. servo motor controller 155 and the A.C. servo motor 1 are both connected as the load so that the voltage developed across the terminals P and N is controlled at the fixed voltage. In FIG. 17, while in the case of the A.C. servo motor as has already been described, the information relating to the velocity and the information relating to the positions are fed back through the encoder feedback, in the case of the power source side converter controller, the voltage developed across the ballast capacitor 25 as the output of the power source side converter main circuit 151 is fed back.

Now, while the main microprocessor 31-2 and the sub-microprocessor 31-1 are operated on the basis of the clock signals from the respective oscillators and also with respect to the position control, the velocity control, and the current control, the respective control softwares are executed at the fixed period, in the above-mentioned embodiment, there is adopted the method wherein the main microprocessor 31-2 and the sub-microprocessor 31-1 are operated asynchronously with each other. Next, the description will hereinbelow be given with respect to an embodiment wherein the computing processings executed by these microprocessors are synchronized with each other.

Figure 18:
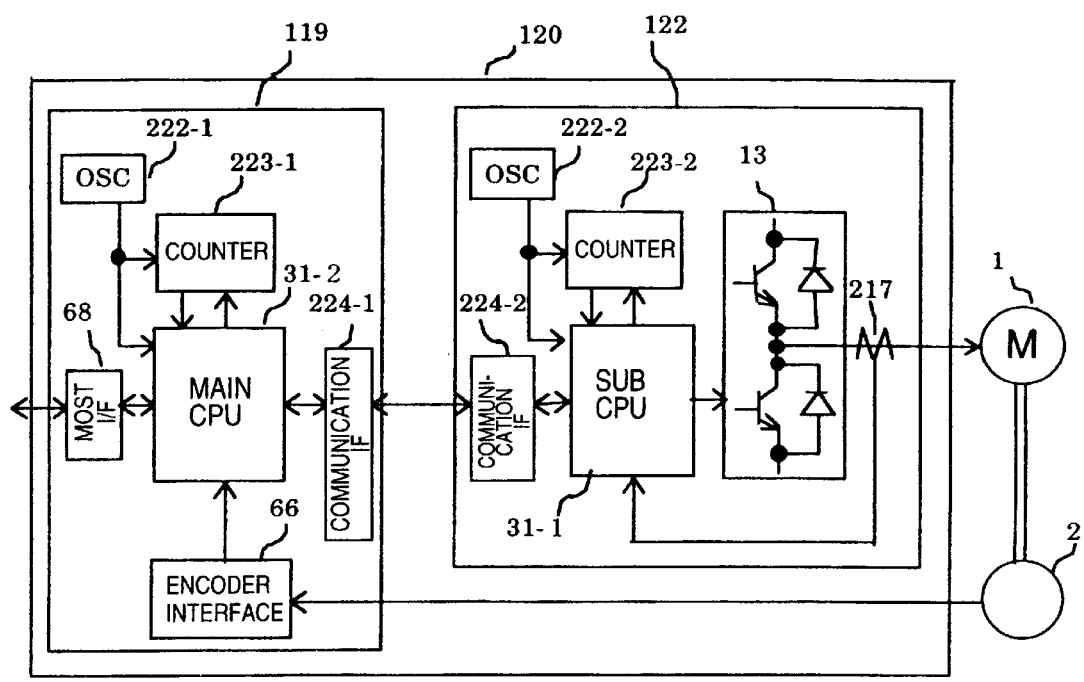
FIG. 18 is a block diagram, partly in circuit diagram, showing a hardware configuration of a motor controller as a concrete embodiment to which the present invention is applied.

FIG. 18 is a control block diagram, partly in circuit diagram, showing a configuration of a motor controller in which the main microprocessor 31-2 and the sub-microprocessor 31-1 are respectively operated by oscillators 222-1 and 222-2. The information relating to the necessary control periods is respectively generated by counter circuits 223-1 and 223-2 on the basis of the clock signals outputted from the oscillators 222-1 and 222-2 and then are supplied as the interrupt signals which are used to activate the control softwares to the main microprocessor 31-2 and the sub-microprocessor 31-2, respectively. In addition, the exchange of the control information between the main microprocessor 31-2 and the sub-microprocessor 31-1 is carried out through communication interfaces 224-1 and 224-2 in the serial communication manner.

Figure 19:
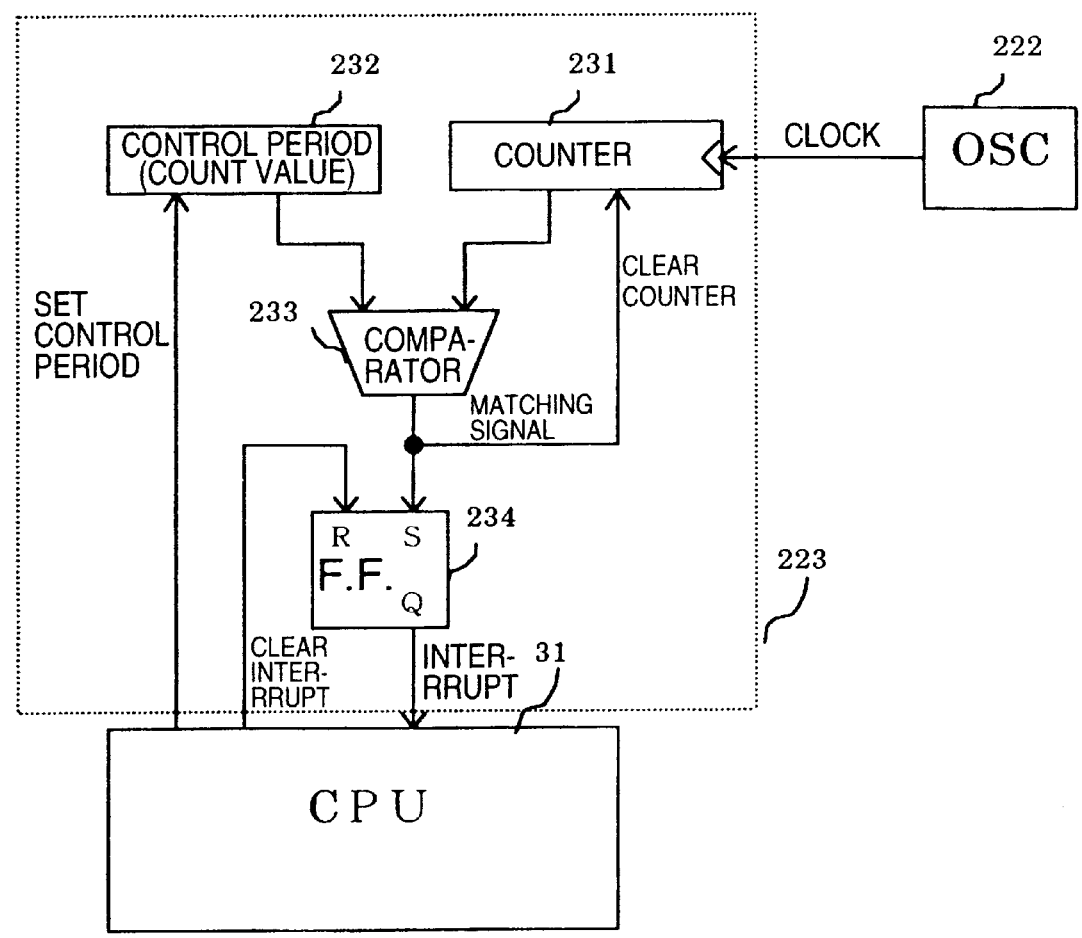
FIG. 19 is a block diagram showing a detailed configuration of a counter circuit in the asynchronous system.

Next, the description will hereinbelow be given with respect to the counter circuit 223 with reference to FIG. 19 (the constituent elements the symbols of which have no suffix are common in the description to the control circuit in the logic printed circuit board 119 and the control circuit in the power module 122, and so forth). This circuit includes a counter circuit 231 for counting the clock signal outputted from the oscillator 222 and a control period register 232 for storing therein the information relating to the necessary control period as the number of clock pulses. The values in the counter 231 and the register 232 are compared with each other by a comparator 233 at all times. When these values match each other, the comparator 233 outputs a matching signal. The contents of the counter 231 are cleared on the basis of the matching signal and at the same time, a flip-flop 234 is set on the basis of the matching signal, and the output signal from the flip-flop 234 is inputted as the interrupt signal to the CPU 31 to activate the control software of the CPU 31. In addition, in the control software, the flip-flop (F.F.) 234 which has generated the interrupt signal must be cleared to make provision for the interrupt during the next control period.

Figure 20:
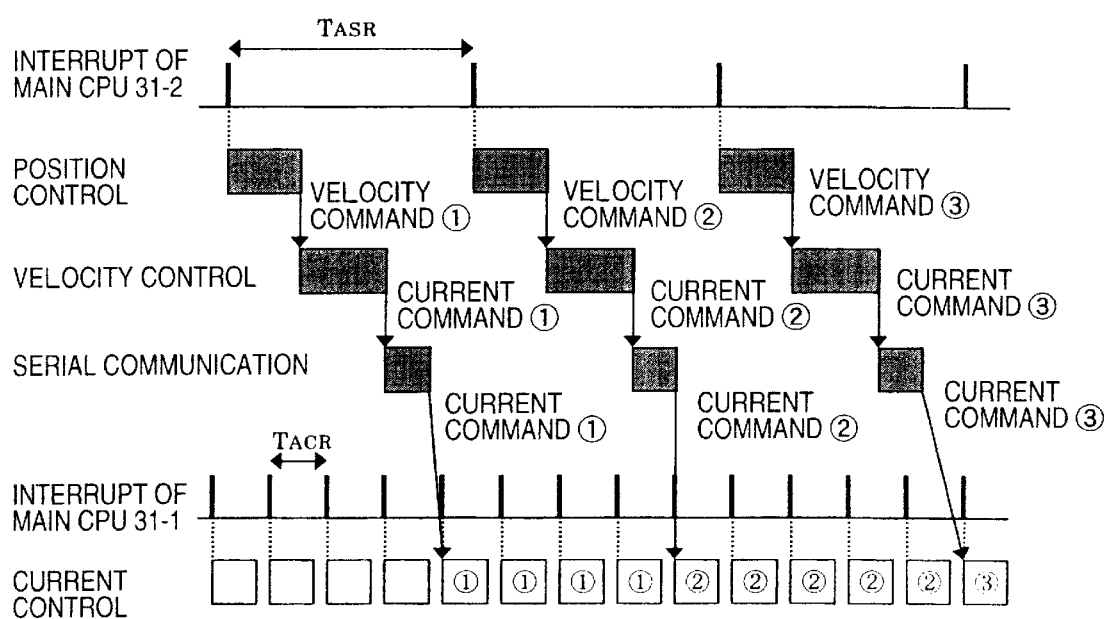
FIG. 20 is a timing chart useful in explaining the control processings in the asynchronous system.

First of all, the description will hereinbelow be given with respect to the timing of each of the control processings in the asynchronous method with reference to FIG. 20. As described above, while the interrupt signal is inputted to the logic printed circuit board 119 at the fixed period (assigned TASR) to activate the control software, first of all, the position control processing is activated. The serial communication is started in such a way that at the time when the position control processing has been completed, the velocity command Nref as the result thereof is delivered to activate the velocity processing, and next at the time when the velocity control processing has been completed, the current command Iref as the result thereof is transferred to the power module 122. Next, in the power module 122, the current control processing is activated at the fixed control period (assigned TACR). But, since the current command Iref which is required for the current control processing is, as described above, transferred from the logic printed circuit board 119 in the serial communication manner, the current command which was received before having activated the present current control processing is used. Now, as apparent from FIG. 20, since the logic printed circuit board 119 and the power module 122 execute the respective processings at the independent timing, the time period ranging from the time to carry out the serial communication up to the time to activate the current control processing is not fixed but is always changed. In other words, it is said that the time period ranging from the time to start the velocity control processing up to the time to start the current control processing is not fixed. In addition, while in accordance with the current command which has been obtained from the number of one time of velocity control processing, the number of several times of current control processings are executed, this number of times does not become fixed depending on the timing. For example, as shown in FIG. 20, for the current command ①, the current control processing is executed four times, while for the current command ②, the current control processing is executed five times.

As described above, if the time difference (the phase difference) between the upper control processing and the lower control processing does not become fixed and also the ratio of the number of times of respective control processings does not become fixed, in particular, when increasing the control responsibility, this influences upon the control characteristics so that the control characteristics may become unstable in some cases.

Then, there is provided the means for setting the control periods in such a way that the control period of the upper control unit becomes integral multiples of the control period of the electric power supplying unit and for monitoring the time difference between the time to start the serial communication for the transmission of the control information between the two microprocessors and the time to start the control processing to change the control period in such a way that the time difference becomes fixed.

Figure 21:
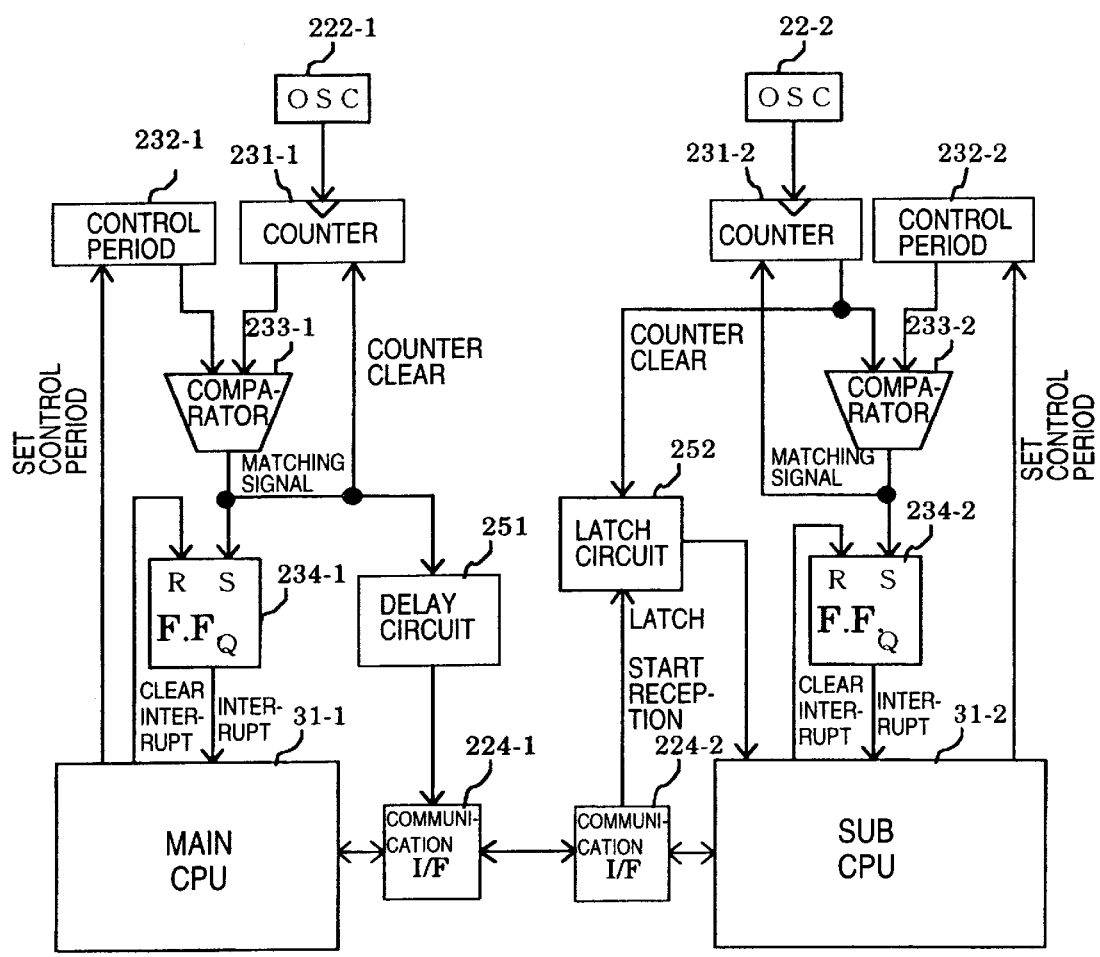
FIG. 21 is a block diagram showing a configuration of an embodiment of a counter circuit according to the present invention.

First of all, a point of difference from the asynchronous method is the contents of the counter circuits 223-1 and 223-2 and this difference will now be described with reference to FIG. 21.

In the present embodiment, in order to carry out the synchronization of the processings between the different microprocessors, there is adopted the method wherein by utilizing the timing of the serial communication through the respective interfaces, the respective processings are synchronized with each other. Therefore, first of all, in the logic printed circuit board 119 which acts as the host station for the serial communication, the communication must be carried out after a lapse of the accurately fixed time delay with respect to the interrupt signal on the basis of which the position control unit and the velocity control unit are both activated. The means for realizing this is a delay circuit 251. Then, after a lapse of the fixed time delay with respect to an activation interrupt timing signal for the control processing, the communication interfaces are activated. Now, the delay time provided by the delay circuit 251 corresponds to the time period up to the time when the position control processing and the velocity control processing which are executed by the logic printed circuit board 119 have been completed. However, since in the normal control processing, the dispersion in the processing time due to the command value and the state of the control object is hardly present, it is easy to decide the delay time.

On the other hand, in the power module 122 which acts as the slave station in the serial communication, the difference between the time to generate the interrupt signal which is used to start the current control processing and the time to start the serial communication must be monitored at all times. For this reason, upon start of the serial communication, the reception start signal is outputted through the communication interface 224-2, and the count value of the counter 231-2 which is used to generate the control period on the basis of the reception start signal is latched by a latch circuit 252. Since the data thus latched is the data which represents directly the above-mentioned time difference, it is fetched in the CPU 31-2 in order to be used to adjust the control period as will be described later.

Next, the description will hereinbelow be given with respect to the timing of each of the control processings with reference to FIG. 22.

First of all, the description will now be given with respect to the relation between the control period in the logic printed circuit board 119 and the control period in the power module 122.

When it is assumed in the present embodiment that the period of the position control and velocity control units in the logic printed circuit board 119 is TASR, and the period of the current control in the power module 122 is TACR, these periods are set in such a way as to obtain the following relation.

$$TASR = 4 \times TACR$$

In order to establish the above-mentioned relation, by taking the frequencies of the respective oscillators into consideration, the contents of the respective control period registers (232-1 and 232-2 in FIG. 21) may be set. In such a way, by making the control periods match each other, in the case of the short time period, the respective control periods can also be synchronized with each other. However, since the oscillator which becomes the base of generating the control period has necessarily the errors, the synchronization can not be continuously maintained, and hence the means for adjusting the phase difference between the control periods is necessarily required. While the hardware of this means is as described with reference to FIG. 21, the operation timing will now be described.

Figure 22:
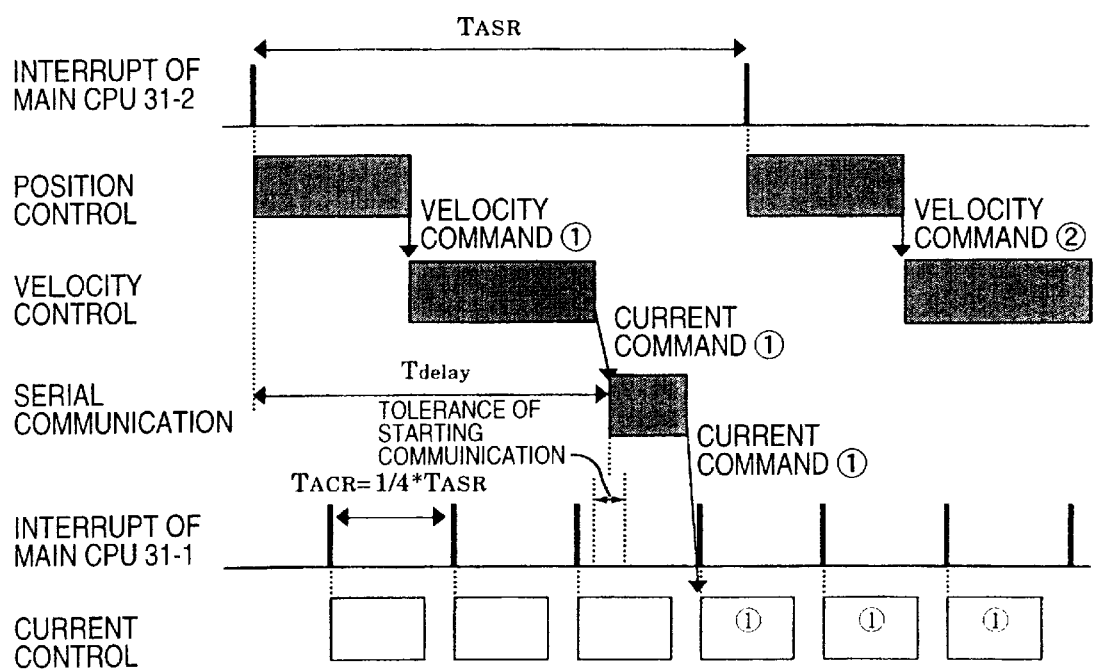
FIG. 22 is a timing chart useful in explaining the control processings of FIG. 21 of the embodiment according to the present invention.

As apparent from FIG. 22, the serial communication which is carried out by the logic printed circuit board 119 is activated after a lapse of the time delay Tdelay with respect to the time to start the control processing interrupt in the logic printed circuit board 119. While in the power module 122, the time to start the serial communication can be, as described above, detected as the count value of the counter, if the current control period is adjusted in such a way that the detection becomes prior with respect to the start of the next current control processing by the time period required for the serial communication, then the control can be carried out with the least time delay. But, this adjustment must be set by taking the various kinds of fluctuation factors into consideration in such a way that the completion of the communication becomes in time for the current control processing. In addition, as shown in FIG. 22, in terms of operating stably the function of adjusting the control period, the serial communication start time is given the fixed tolerance.

Figure 23:
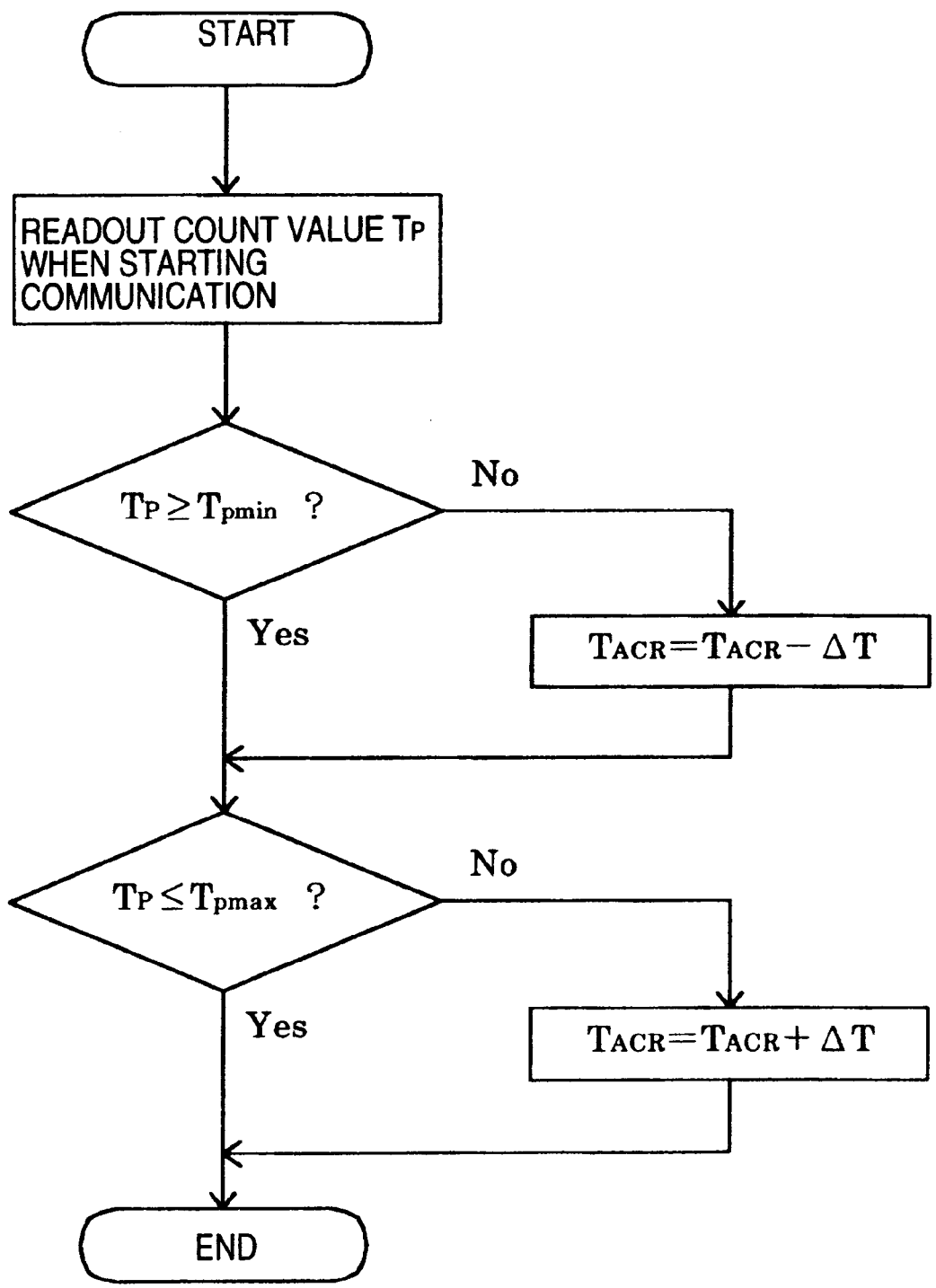
FIG. 23 is a flow chart useful in explaining the algorithm for adjusting the control period in an embodiment according to the present invention.

FIG. 23 is a flow chart useful in explaining the algorithm on the basis of which the adjustment of such a control period is realized, and this algorithm will hereinbelow be described in detail.

First of all, it is assumed that the detection value of the time to start the serial communication is TP, and the tolerance of the start time is in the range of TPmin to TPmax. But, it is assumed that for these times, the count value of the above-mentioned counter is used as it is.

In addition, the processing which is shown in the form of a flow chart in FIG. 23 is assumed to be executed every period of the serial communication. When in the present flow, the time to start the serial communication is advanced within the current control period, it is judged that the current control period is delayed and then the current control period is shortened by ΔT.

Conversely, when the time to start the serial communication is delayed within the current control period, it is judged that the current control period is advanced, and then the current control period is prolonged by ΔT. The charge of the control period becomes possible by changing the value of the control period register 32-2 of the counter circuit for generating an interrupt on the basis of which the control processing is activated. In addition, if ΔT is set to 1 which is minimum in the present count value, then the present adjustment function will be stably operated.

Above, in the present embodiment, the description has been given with respect to the case where in the serial communication established between the logic printed circuit board 119 and the power module 122, the logic printed circuit board 119 is the host station, and the power module 122 is the slave station. While in the normal motor controller, in general, such a relation is provided, in the other way around, i.e., the configuration in which the power module 122 is the host station and the logic printed circuit board 119 is the slave station is also possible. In such a case as well, the same method as that which has been described until now may be adopted. More specifically, the contents of interest are as follows.

First of all, the power module 122 which is the host station in the serial communication starts the serial communication synchronously with the current control period. On the other hand, the logic printed circuit board 119 as the slave station monitors the time to start the communication within the position and velocity control period at all times to adjust the period of the position and velocity control processing in such a way that the communication start time falls within the fixed tolerance. In this connection, in this case, the delay circuit for starting the serial communication for the control period needs to be provided in the power module 122 and also the latch circuit for detecting the time to start the communication needs to be provided in the logic printed circuit board 119.

While in the above-mentioned embodiments, the description has been given by taking as an example the A.C. servo motor controller in which the I/O of the power module is the three-phase current, even when for the I/O of the power module, the single-phase current is employed, or the single-phase current and the three-phase current are mixedly employed, or the multiple-phase current the multiple-phase of which exceeds the three-phase is employed, the present invention can be similarly applied to the controller as long as the controller has the similar configuration. Also, in addition to the A.C. servo motor controller, the present invention may be similarly applied to the inverter apparatus which has the control system in which the current control unit and other velocity control unit and the like are mixedly provided (the A.C. servo motor is also a kind of inverter apparatus). In addition, the present invention may be similarly applied to even the D.C. current receiving style for which the diode rectifier 43 is not required at all. In addition, the present invention may be similarly applied to the case where the D.C. electric motor is driven on the basis of the D.C. output with the inverter circuit 45 replaced with the chopper circuit.

In addition, it is to be understood that the embodiments of the present invention shown in FIGS. 5 to 23 are no more than the illustrative embodiments, and hence this description is not intended to be construed in a limiting sense and the various changes and modifications will occur to those skilled in the art without departing from the scope and true spirit of the invention. The scope of the invention is therefore to be determined solely by the appended claims.

In addition, while the present invention shows the great effects in the environment in which there are much dust and cotton dust and the humidity is high, the insulation between the conductors can be prevented from being degraded due to the long-term use in addition to such sever environment. Therefore, the present invention can be widely applied to the general environment.

Above, while it has been described that when the malfunction occurs in the current control system due to the influence of the adhesion of the dust and the cotton dust, this leads to the serious accident, and hence it is important to improve the reliability of that current control system, in accordance with the above-mentioned embodiments, the following effects can also be obtained. That is, if for the position or velocity feedback control loop, the control method of interest is changed into the control method to which the requests from users or the like are adopted, or the change occurs in the control method (for example, the method of the auto tuning in the vector control, or the like) or the like, the contents stored in the ROM 34 and the EEPROM 58 as the storage means shown in FIG. 5 and the configuration of other control circuits need to be changed. On the other hand, such changes hardly occur in the current control system and the main circuit. Therefore, if only the current control system is integrated, or the current control system and the main circuit are integrated into the module, even when the change occurs in the host portion of the current control system, the current control system can be commonly used, and hence there is provided the effect that the current control system becomes suitable for the mass production.

In addition, in accordance with the above-mentioned embodiments, the host dedicated CPU which takes, while the low speed task, charge of the software in which the function of the overall management and the convenienceness in use is regarded as important, and the current control dedicated CPU which takes charge of the software of the high speed task with which the high speed responsibility for the current control is realized are provided, and also the processing portion in the current control loop of which the current control dedicated CPU takes charge is modularized separately from the host dedicated CPU portion, and the data is serially transmitted between the host dedicated CPU and the current control dedicated CPU. The form of the serial data transmission portion is changed from the individual phase data (the three-phase data) for the conventional three-phase A.C. motor into the D.C. data which is obtained in the form of the internal signal of the vector control (in general, the D.C. data is the d-q axis two phases of the excitation component (d-axis) and the torque component (q-axis). But, in the case of the permanent magnet type synchronous motor, since the excitation component is not controlled, Id=0 is established and hence the data can be reduced to only one phase component of the q-axis) to reduce the amount of data, and also the serial data transmission portion can be detected on the magnetic pole positions detection side of the electric motor to be serially transmitted together with the D.C. data. Therefore, in accordance with the above-mentioned embodiments, the interface through which the data is transmitted between the module into which the current control system is integrated and the host dedicated CPU is very simplified and hence there is provided the effect that the number of signal lines for the data transmission is reduced. In addition thereto, there is also provided the effect that the electrical insulation between the host portion having the host dedicated CPU and the module portion having the current control dedicated CPU can be readily carried out. This becomes more advantageous as compared with the case where when for example, a part of the controller 122 is integrated into the module, the interface is formed between other parts (e.g., between the position control system and the velocity control system).

As set forth hereinabove, according to the present invention, since the signal conducting portion of the forward element and the feedback element of the current feedback loop is not exposed to the external ambient atmosphere at all, no electrical short circuit occurs between the adjacent lead terminals at all. In addition, since the current limiter is provided for the current command, even if the excessive input is inputted through the command input terminals or the electrical short circuit occurs therebetween, the level of the current command is limited to the level equal to or lower than the maximum value and hence any of the switching devices is prevented from being broken down. As a result, the reliability of the products is greatly improved.

What is claimed is:

1. A current control circuit for supplying a drive signal to a gate or a base of each of switching devices which constitute a current feedback control loop for controlling a current of an electric motor on the basis of a current command and which are included in an inverter main circuit, wherein a signal conducting portion of a feedback element from a current detection point of said electric motor to a summing point at which a feedback signal of the detected current is added to the current command, and a signal conducting portion of a forward element from said summing point to the gate or base drive signal portion are hermetically encapsulated together with each other without being exposed to the external ambient atmosphere.

2. A current control circuit according to claim 1, wherein a current control system constituting said current feedback control loop is provided with a current limiter circuit for limiting the magnitude of the current command, and said current limiter circuit is hermetically encapsulated together with said signal conducting portion of said feedback element and said signal conducting portion of said forward element without being exposed to the external ambient atmosphere.

3. A current control circuit constituting a current feedback control loop for supplying a signal with which each of switching devices is driven, wherein a signal conducting portion ranging up to a summing point at which a current feedback signal is added to a current command, and a signal conducting portion ranging from said summing point up to a drive signal portion of said switching devices are hermetically encapsulated without being exposed to the external ambient atmosphere.

4. An inverter controller which is designed in such a way as to constitute at least a position or velocity feedback control loop and also to constitute a current feedback control loop for controlling a current of an electric motor on the basis of a current command, which has been issued from said position or velocity feedback control loop, in the inside of said feedback control loop to supply a drive signal to each of gates or bases of switching devices which are included in an inverter main circuit, wherein a signal conducting portion of a feedback element from a current detection point of said electric motor to a summing point at which a feedback signal of the detected current is added to the current command, and a signal conducting portion of a forward element from said summing point to the gate or base drive signal portion are hermetically encapsulated together with each other without being exposed to the external ambient atmosphere, and wherein a first microprocessor is provided in a part constituting said position or velocity feedback control loop; a second microprocessor is provided in a part constituting said current feedback control loop; system clock signals are respectively supplied to said first and second microprocessors independently of each other; magnetic pole positions data from a magnetic pole positions detector of said electric motor and rotational speed and position data from a rotational speed and position detector are both fed back to said first microprocessor; the current command and the magnetic pole positions data are transmitted or transferred from said first microprocessor to said second microprocessor in a serial communication manner; and the magnetic pole positions data in said second microprocessor is obtained on the basis of the interpolation between the magnetic pole positions data at the last time and the magnetic pole positions data at the current time from said first microprocessor to compute the positions of the magnetic poles.

5. An inverter apparatus which constitutes at least position or velocity feedback control loop and which constitutes a current feedback control loop which receives a current command obtained in said position or velocity feedback control loop to drive inverter main circuit switching devices on the basis of the current command to control a current of an electric motor in the inside of said position or velocity feedback control loop, wherein a feedback element from a detection point at which the current of said electric motor is detected to a summing point at which a feedback signal of the detected current the polarity of which is inverted is added to the current command signal, a forward element from said summing point to a gate or base drive signal portion of said inverter main circuit switching devices, an inverter main circuit in which multiple arms of multiple phases are connected in parallel to one another in each of which two inverse parallel circuits are connected in series to each other in each of which at least said switching devices and diodes are connected in parallel to each other in a reverse direction, a current limiter circuit for limiting the current command, and insulating devices through which the signals are transmitted with those signals electrically insulated from one another in an input portion of the current command are self-contained in a power module to be hermetically encapsulated.

6. An inverter apparatus according to claim 5, wherein a first microprocessor is provided in a part constituting at least a position or velocity feedback control loop; a second microprocessor is provided in a part constituting a current feedback control loop; system clock signals are respectively supplied to said first and second microprocessors independently of each other; magnetic pole positions data from a magnetic pole positions detector of an electric motor and rotational speed and position data from a rotational speed and position detector are both fed back to said first microprocessor; and the current command and the magnetic pole positions data are transferred from said first microprocessor to said second microprocessor in a serial communication manner.

7. An inverter apparatus which has a current control system for controlling a current of an electric motor in such a way that the current matches a current command and which is configured in such a way as to drive each of inverter main circuit switching devices on the basis of a signal from said current control system, wherein a feedback element from a detection point at which the current of said electric motor connected to the output of an inverter is detected to a summing point at which a feedback signal of the detected current the polarity of which is inverted is added, a forward element from said summing point to a gate or base drive signal portion of said inverter main circuit switching devices, an inverter main circuit in which multiple arms of multiple phases are connected in parallel to one another in each of which two inverse parallel circuits are connected in series to each other in each of which at least said switching devices and diodes are connected in parallel to each other in a reverse direction, a current limiter circuit for limiting the current command, and insulating devices through which the signals are transmitted with those signals electrically insulated from one another in an input portion of the current command are self-contained in a power module to be hermetically encapsulated.

8. An electric power converter including a main circuit for receiving a D.C. or A.C. voltage to drive and control each of switching devices, thereby converting the D.C. or A.C. voltage into an arbitrary D.C. voltage or an arbitrary A.C. voltage having an arbitrary frequency, and a current feedback control loop for controlling the current, which is caused to flow through said main circuit, on the basis of a current command, wherein a feedback element up to a summing point at which a current feedback signal is added to the current command, a forward element from said summing point up to a drive signal portion of said switching devices, and said main circuit are molded with resin integrally with one another to be hermetically encapsulated.

9. An electric motor driving apparatus having: a main circuit for receiving a D.C. or A.C. voltage to drive and control each of switching devices, thereby converting the D.C. or A.C. voltage into an arbitrary D.C. voltage or an arbitrary A.C. voltage having an arbitrary frequency, and a current feedback control loop for controlling the current, which is caused to flow through said main circuit, on the basis of a current command and a current feedback signal; and an electric motor which is connected to the output of said electric power converter to be rotationally driven, wherein a feedback element up to a summing point at which the current feedback signal is added to the current command, a forward element from said summing point up to a drive signal portion of said switching devices, and said main circuit are molded with resin integrally with one another to be hermetically encapsulated.

10. An electric motor driver including: a host control unit which has a position feedback and a velocity feedback for an electric motor to carry out the automatic control for the position and the velocity using a microprocessor; and an electric power supply unit which has a feedback for a supplied current to said electric motor to carry out the automatic control for the current using a microprocessor different from the first mentioned microprocessor microprocessor, the control information being exchanged between said host control unit and said electric power supply unit through the serial communication, thereby carrying out the control of said electric motor, wherein the position and velocity control period of said host control unit is integral multiples of the current control period of said electric power supply unit, and both of the control periods are synchronized with each other.

11. A method of controlling an electric motor driver having a host control unit and a power supply unit, said host control unit having a first microprocessor for implementing a feedback control of a position and a speed of the motor to coincide with target values, said power supply unit having a second microprocessor for implementing a feedback control of a supplied current to the motor to coincide with a target value, said method comprising the steps of:

transmitting control information in a form of a serial signal from said host control unit to said power supply unit synchronously with a control period of the position and speed of the motor; and detecting a time difference between a reception timing of said serial signal at said power supply unit and an initial timing of said control period of the current to the motor by said power supply unit, and controlling said control period of the current to the motor so as to maintain the time difference within a fixed range.

12. A method of controlling an electric motor driver having a host control unit and a power supply unit, said host control unit having a first microprocessor for implementing a feedback control of a position and a speed of the motor to coincide with target values, said power supply unit having a second microprocessor for implementing a feedback control of a supplied current to the motor to coincide with a target value, said method comprising the steps:

transmitting control information in a form of a serial signal from said power supply unit to said host control unit synchronously with a control period of current to the motor; and detecting a time difference between a reception timing of said serial signal at said host unit and an initial timing of said control period of the position and speed of the motor by said host unit, and controlling said control period of the position and speed of the motor so as to maintain the time difference within a fixed range.

* * * * *